US008422775B2

(12) United States Patent
Wang et al.

(10) Patent No.: US 8,422,775 B2
(45) Date of Patent: Apr. 16, 2013

(54) AUTOMATIC VIDEO IMAGE SEGMENTATION

(75) Inventors: Jue Wang, Seattle, WA (US); Xue Bai, Minneapolis, MN (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/448,162

(22) Filed: Apr. 16, 2012

(65) Prior Publication Data

US 2012/0213432 A1 Aug. 23, 2012

Related U.S. Application Data

(63) Continuation of application No. 12/275,096, filed on Nov. 20, 2008, now Pat. No. 8,175,379.

(60) Provisional application No. 61/091,242, filed on Aug. 22, 2008.

(51) Int. Cl.
*G06K 9/34* (2006.01)
(52) U.S. Cl.
USPC ............ 382/164; 382/162; 382/171; 382/173
(58) Field of Classification Search .................. 382/164, 382/111, 103, 118, 168, 291, 162, 173, 171; 348/77, E7.085, 172; 358/453, 1.9, 447; 600/450; 347/195, 196
See application file for complete search history.

(56) References Cited

U.S. PATENT DOCUMENTS

| 5,875,040 | A | 2/1999 | Matraszek et al. |
| 6,724,915 | B1 | 4/2004 | Toklu et al. |
| 6,912,310 | B1 | 6/2005 | Park et al. |
| 6,917,692 | B1 * | 7/2005 | Murching et al. ............ 382/103 |
| 7,242,809 | B2 | 7/2007 | Hunter et al. |
| 7,397,935 | B2 | 7/2008 | Kimmel et al. |
| 7,440,589 | B2 | 10/2008 | Garoutte |
| 7,965,875 | B2 | 6/2011 | Ionita et al. |
| 8,009,184 | B2 * | 8/2011 | Saquib .......................... 347/195 |

FOREIGN PATENT DOCUMENTS

| CN | 101676953 | 3/2010 |
| CN | 1030572 | 8/2012 |

OTHER PUBLICATIONS

Apostoloff, et al., "Automatic Video Segmentation Using Spatiotemporal T-junctions," 2006.
Porikli, et al., "Automatic Video Object Segmentation Using Volume Growing and Hierarchical Clustering," EURASIP Journal on Applied Signal Processing 2004:6, pp. 814, 832, 2004 Hindawi Publishing Corporation.
Zhong, et al., "Interactive Tracker—A Semi-Automatic Video Object Tracking and Segmentation System," Microsoft Research China, IEEE, 2001, 4 pages.
"Non-Final Office Action", U.S. Appl. No. 12/275,096, (Sep. 19, 2011), 5 pages.
"Notice of Allowance", U.S. Appl. No. 12/275,096, (Jan. 5, 2012), 7 pages.

* cited by examiner

*Primary Examiner* — Anh Hong Do
(74) *Attorney, Agent, or Firm* — Wolfe-SBMC

(57) ABSTRACT

A method, system, and computer-readable storage medium for automatic segmentation of a video sequence. A segmentation shape prediction and a segmentation color model are determined for a current image of a video sequence based on existing segmentation information for at least one previous image of the video sequence. A segmentation of the current image is automatically generated based on a weighted combination of the segmentation shape prediction and the segmentation color model. The segmentation of the current image is stored in a memory medium.

20 Claims, 16 Drawing Sheets

AUTOMATIC VIDEO IMAGE SEGMENTATION

This application is a continuation of U.S. application Ser. No. 12/275,096, filed Nov. 20, 2008 now U.S. Pat. No. 8,175,379, which is incorporated by reference herein in its entirety.

PRIORITY DATA

This application claims benefit of priority to U.S. Provisional Application Ser. No. 61/091,242 titled "Automatic Video Image Segmentation", filed Aug. 22, 2008, whose inventors are Jue Wang and Xue Bai, and which is hereby incorporated by reference in its entirety.

BACKGROUND

1. Field of the Invention

The present invention is directed generally to digital image processing, and more particularly to automatic segmentation of images in a video sequence.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways.

There are many digital video applications that require segmentation of each video image or frame, e.g., into a foreground image or object/region of interest and a background. Prior art approaches to such segmentation involve manually segmenting each frame image using various image editing tools. However, such manual segmentation is time-consuming, tedious, and error prone.

SUMMARY

Various embodiments of systems, methods, and computer-readable storage media for performing automatic segmentation of images in a video sequence are presented.

First, a segmentation shape prediction and a segmentation color model for a current image (e.g., a first image) of a video sequence may be determined based on existing segmentation information for at least one previous image of the video sequence. For example, in one embodiment, a user may manually segment the current image into a foreground and a background, storing the segmentation information for this current image, including a segmentation contour that divides the background from foreground, e.g., a foreground object, in the image.

The determination of the shaped prediction and color model may be performed via any of a variety of techniques, as desired. For example, regarding shape prediction, in one embodiment, scale invariant feature transform (SIFT) techniques may be employed to generate an estimate or rough version of the segmentation contour for the current image based on the at least one previous image of the sequence, i.e., based on the pre-existing segmentation contour. SIFT key points are reliable features for consecutive frames in videos. By matching the SIFT key points of the previous image/frame with corresponding key points in the current image/frame, one can determine a good initial guess of the contour in the current (or new) frame. Thus, once the affine transform has been determined based on the matching key points in the two frames, the initial contour may be transformed to generate a rough estimate or predicted shape of the contour for the subsequent frame. In some embodiments, a plurality of local classifiers may be constructed along the contour and used to perform operations with respect to the contour. For example, in some embodiments, a sliding window approach may be employed, where each classifier, whose center point lies on the contour, defines and operates on a local region around a respective contour point (the classifier's center), integrating color and shape information from the previous frame, e.g., a color model and a shape prediction, and determining the predicted contour accordingly. Thus, the shape alignment process may operate to roughly align the classifier windows with the foreground object in frame i+1.

More specifically, in some embodiments, generating a local segmentation shape prediction based on the respective portion of the shape contour may include generating an initial local segmentation shape prediction via scale invariant feature transform (SIFT) applied to a plurality of key points in the respective region, and generating the local segmentation shape prediction by refining the estimate of the initial local segmentation shape prediction using optical flow applied to points along the respective portion of the shape contour. In one embodiment, generating the local segmentation shape prediction by refining the estimate of the initial local segmentation shape prediction using optical flow applied to points along the respective portion of the shape contour may include determining a local average flow vector based on optical flow of foreground pixels in the respective region, and applying the local average flow vector to the points along the respective portion of the shape contour to generate the local segmentation shape prediction. A local segmentation color model may be generated based at least on color information for the respective region of the at least one previous image included in the local classifier. Thus, the use of local classifiers to characterize and operate on local regions of the image may significantly enhance the accuracy and results of segmentation, particularly regarding images with complex foreground objects and/or backgrounds.

While applying the transform to each point on the contour (or some specified subset of such points, such as equally spaced sample points along the contour) will generate a rough estimate of the contour that approximately aligns the contour to the image of the subsequent frame, this transformation generally captures the object's principle rigid motion between the two frames, and thus may generally omit motion effects specific to local motion of parts of the object. To determine a better prediction of the contour, optical flow of contour pixels between the transformed frame and the next frame may be computed. However, due to the unreliability of optical flow on the boundary, e.g., where occlusion occurs, directly adding the flow vector to the contour points, i.e., at the pixel level, may produce erratic results. Thus, in on embodiment, rather than computing the optical flow based on the contour points themselves (using the center point per classifier), a local average flow inside the contour may be used. By incorporating local averaged optical flow into the process, a more accurate and robust estimated contour may be generated.

Thus, from these two steps (transformation/alignment plus average optical flow), one may generate a prediction of the contour, or, more accurately, a plurality of predicted or estimated contour portions or segments, each covered by and associated with a respective classifier. This predicted or estimated contour may then be used as a shape prior (shape prediction) and may specify positions of the local classifiers.

One approach to calculating the foreground probabilities for the pixels in a propagated classifier is via a Gaussian Mixture Model (GMM). In this approach, all the pixels in the local region or window of the second classifier are sampled except for a narrow band around the contour, which in some embodiments may be defined by ($|d_x|<\Delta$), where $\Delta$ is the width of an uncertainty band in the first classifier, and where $d_x$ is the maximum distance of a pixel x from the contour in the classifier. In other words, pixels near the estimated contour are more difficult to classify as foreground or background pixels because the estimated or predicted contour almost certainly has come error, and so pixels near the estimated contour on the FG side may actually be on the BG side of the actual (unknown) boundary, and vice versa.

In some embodiments, generating a local segmentation color model may include generating a local segmentation simple color model based on color information for the respective region of the at least one previous image included in the local classifier for the at least one previous image, and generating a local segmentation mixed color model based on color information for the respective region of the at least one previous image included in the local classifier for the at least one previous image and color information for the respective region of the current image included in the local classifier for the current image. Discriminability of the local segmentation mixed color model and the local segmentation simple color model may be determined. Generating a local segmentation color model based at least on color information for the respective region of the at least one previous image included in the local classifier may then include selecting the local segmentation simple color model as the local segmentation color model if the local segmentation simple color model has greater discriminability than the local segmentation mixed color model, and selecting the local segmentation mixed color model as the local segmentation color model if the local segmentation mixed color model has greater discriminability than the local segmentation simple color model.

As discussed above, in addition to the color model, a shape prior, i.e., a predicted shape, may also be used to generate the probability or feature map for a classifier region. More specifically, the contribution from the predicted shape (as part of a weighted sum) may be based on the discriminability of the color model, where if the color model makes a clear distinction between foreground colors and background colors, the color model is relied on to classify the pixels of the region, and if the color model does not make a clear distinction, the shape prior is relied on to classify the pixels, with intermediate situations addressed by weights applied to each, e.g., where the weights sum to some normalized value, e.g., 1. In other words, in some embodiments, the weights are coefficients in a linear sum of the color and shape contributions. Note, however, that in other embodiments, the shape and color contributions may be determined by a non-linear combination.

Once the color map for frame i+1 is determined (as described above), it may be used to (re)classify the pixels of frame i (whose actual classifications are already known, since that image has already been segmented), and by determining the errors due to the color model, determine the confidence or reliability of the color model. By using embodiments of the above techniques, each classifier may determine a probability or feature map for a respective portion of the image proximate to the estimated contour.

In one embodiment, the probabilities (i.e., probability or feature maps) in all local windows, i.e., from all local classifiers, may be combined to form a combined feature map. For example, for each local classifier of the plurality of classifiers, a local feature map estimation may be generated based on a weighted combination of the local segmentation shape and the local segmentation color model for the local classifier, where the local feature map estimation classifies pixels in the respective region as background or foreground pixels. Then, a feature map estimation for the current image may be generated by combining the local feature map estimations. A combined probability or feature map for the image (e.g., of frame i+1) may be determined using both color models and shape predictions for each of a plurality of local classifiers. Said another way, a plurality of local feature maps, e.g., foreground masks, may be stitched together to form a global or combined feature map or mask.

A segmentation of the current image may be automatically generated based on a weighted combination of the segmentation shape prediction and the segmentation color model. In one embodiment, the combined feature (probability) map may be used to segment the image (into foreground and background portions). For example, in one embodiment, the combined feature map (i.e., the generated feature map estimation for the current image) may be used to segment the image using an image processing algorithm such as Graph Cut, where the probability values may be set as data cost, after which a GAC (Geodesic Active Contour) algorithm may be performed to further regularize the boundary, e.g., implemented by level sets. Note, however, that any other algorithms and/or tools may be used as desired. In an alternative embodiment, rather than generating a combined feature map, then segmenting the image according to the combined feature map, the local feature maps may each be used to perform a local segmentation for each classifier window, after which these local segmentations (segmented image portions) may be stitched together to form the segmented image.

The segmentation of the current image may be stored, e.g., in a memory medium of the computer system, and/or a memory medium coupled to the computer system, e.g., over a network, e.g., a SAN. The method may then repeat the above-described method elements for subsequent images or frames of the video sequence, as described below in more detail. In other words, the determining a segmentation shape prediction and a segmentation color model for a current image of a video sequence, the automatically generating a segmentation of the current image, and the storing of the segmentation of the current image, may be repeated for one or more contiguous images in the video sequence.

Thus, various embodiments of the systems and methods disclosed herein may be used to automatically perform image segmentation in a digital video image sequence.

Figure 1:
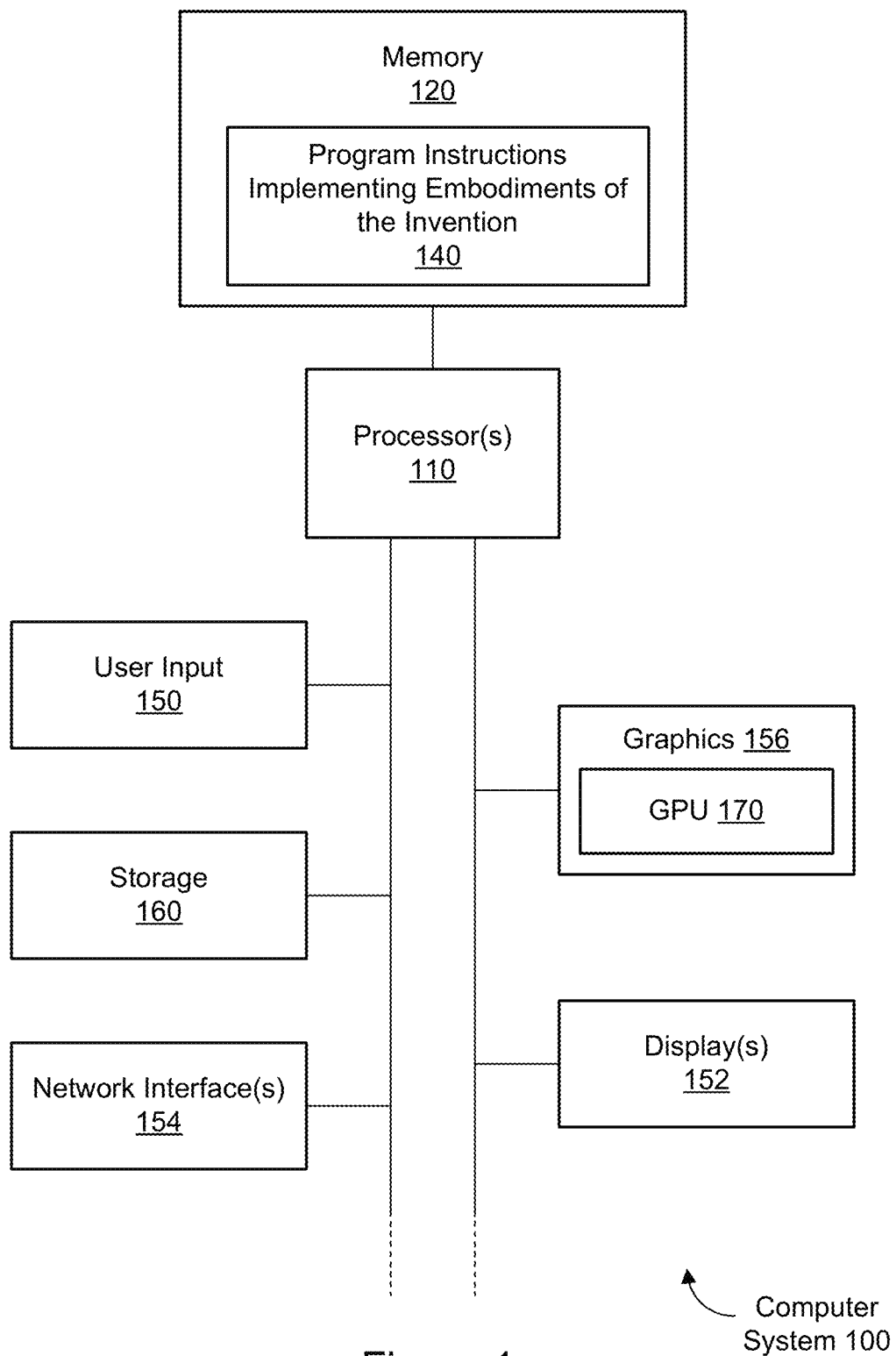
FIG. 1 is a block diagram of an exemplary system configured to implement embodiments of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to automatically perform video image segmentation, e.g., of a region or object of interest, e.g., a foreground object, in a digital video sequence. More specifically, embodiments of the systems and methods disclosed herein may be used to analyze sequential digital video images or frames, and to propagate an initial image segmentation of a frame to one or more subsequent frames, e.g., to automatically generate a sequence of foreground masks for corresponding video frames in a video sequence, based on an initial pre-existing segmentation or mask for an initial or key frame in the sequence. Examples of applications for such masks include, but are not limited to, special effects in digital films, e.g., removing or replacing backgrounds, applying effects to different image layers, and so forth, as well as image decomposition and analysis, e.g., for scientific or security applications, e.g., monitoring, surveillance, face recognition, etc.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and is generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
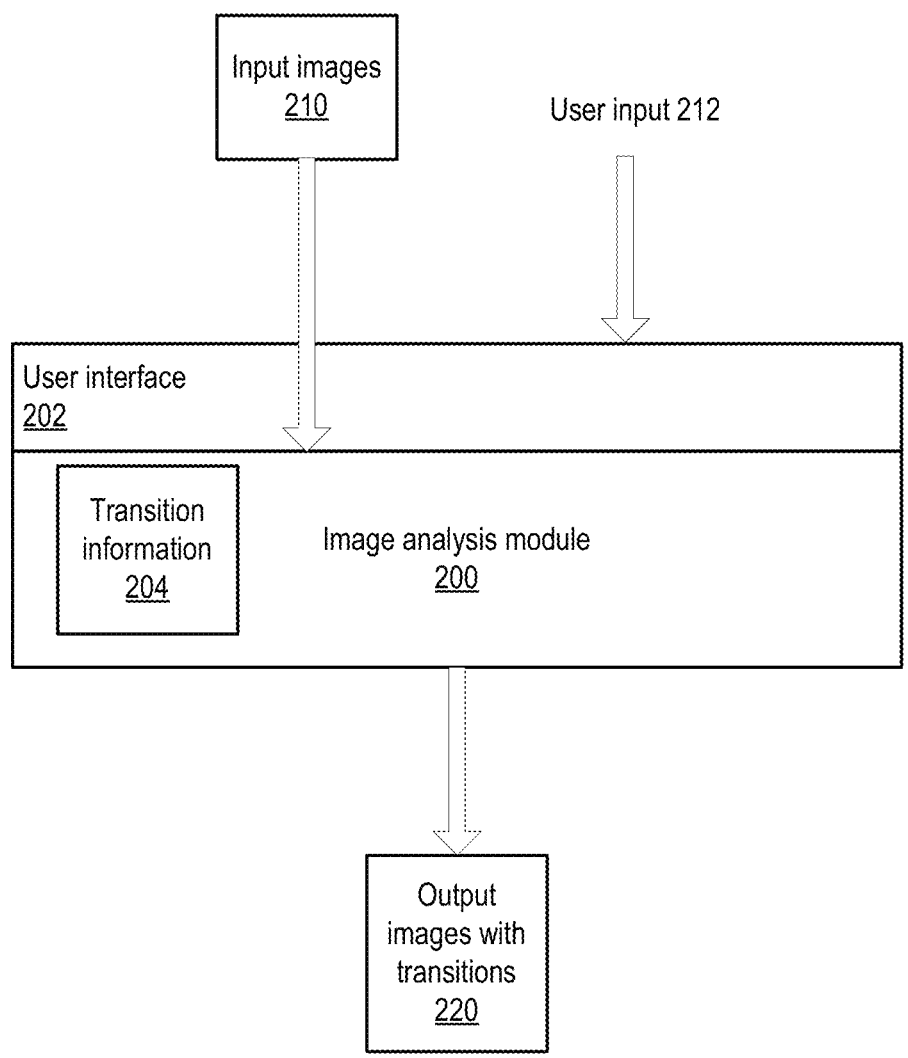
FIG. 2 illustrates an exemplary video image processing module, according to one embodiment.

FIG. 2 illustrates an exemplary image analysis module that may implement embodiments of a method for automatically propagating video image segmentation, as described below with reference to FIG. 6. In one embodiment, module 200 may provide a user interface 202 that includes one or more user interface elements via which a user may initiate, interact with, direct, and/or control the method performed by module 200. Module 200 may obtain a set of digital video images 210 and, optionally, user input 212, analyze an initially segmented image or frame and one or more subsequent frames, and propagate the initial image segmentation to the subsequent one or more frames. Segmentation information 204, e.g., information specifying or facilitating segmentation, and may be used to perform the image analysis or processing.

Image analysis module 200 may be implemented as or in a stand-alone application or as a module of or plug-in for a video processing and/or presentation application. Examples of types of applications in which embodiments of module 200 may be implemented may include, but are not limited to, video editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® Photoshop® and Adobe® Illustrator®. In addition to generating output images 220, module 200 may be used to display, manipulate, modify, and/or store the output images, for example to a memory medium such as a storage device or storage medium.

OVERVIEW

One embodiment disclosed herein provides a robust interactive system and method for video object segmentation. Based on pre-existing segmentation information for a previous (or any other) frame in a video sequence, e.g., provided by a user, e.g., via manual segmentation of the previous frame, the segmentation may be propagated to future or subsequent frames in the video sequence. As will be explained below in more detail, in some embodiments, a sliding window approach may be employed, where each window comprises or is associated with a local classifier that integrates color and shape information from the previous frame, e.g., a color model and a shape prediction, referred to as "priors", to classify pixels covered by the classifier as foreground or background pixels. These two priors may be combined with adaptive weights related to the discriminativity of the color model. Classification results from individual local classifiers may then be combined to form an accurate feature map, and a binary segmentation of the image performed based on the feature map. This process may iterate until the segmentation contour converges. Note that in some embodiments, the iterations for each window may be terminated as each window converges.

Figure 3:
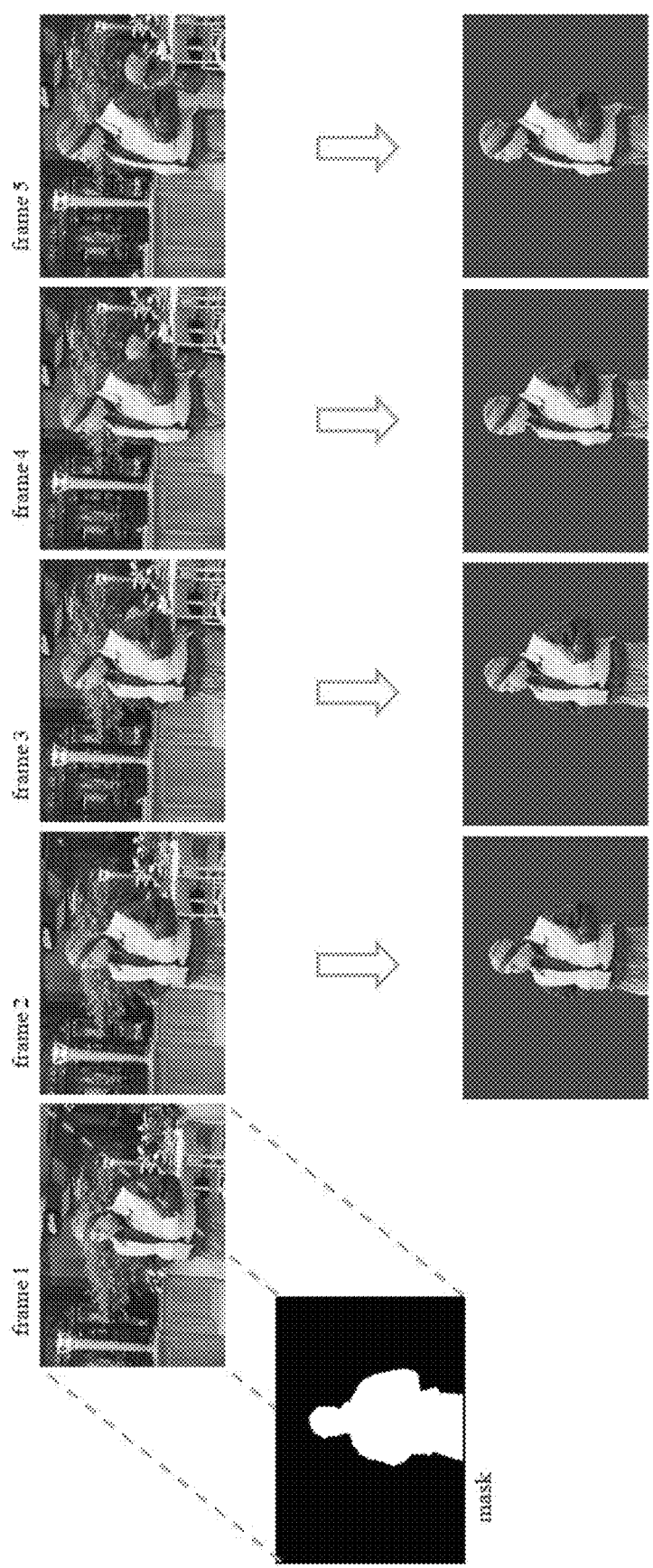
FIG. 3 illustrates an exemplary video sequence with segmentation/masking, according to one embodiment.

FIG. 3 illustrates an exemplary video sequence, specifically, frames 1 through 5, where a segmentation has been performed, e.g., manually, on the first image (frame 1) of the sequence, as illustrated by the binary mask associated with the first image, where the white region of the mask corresponds to the foreground and the black region corresponds to the background. Below frames 2 through 5 are shown corresponding video images where respective masks have been applied to each image to remove all background image information, leaving only the foreground object of each image. In embodiments described herein, the segmentation of each image (into foreground and background portions) upon which such masking is based may be determined automatically from previous segmentation information, e.g., from the segmentation of frame 1.

Figure 4:
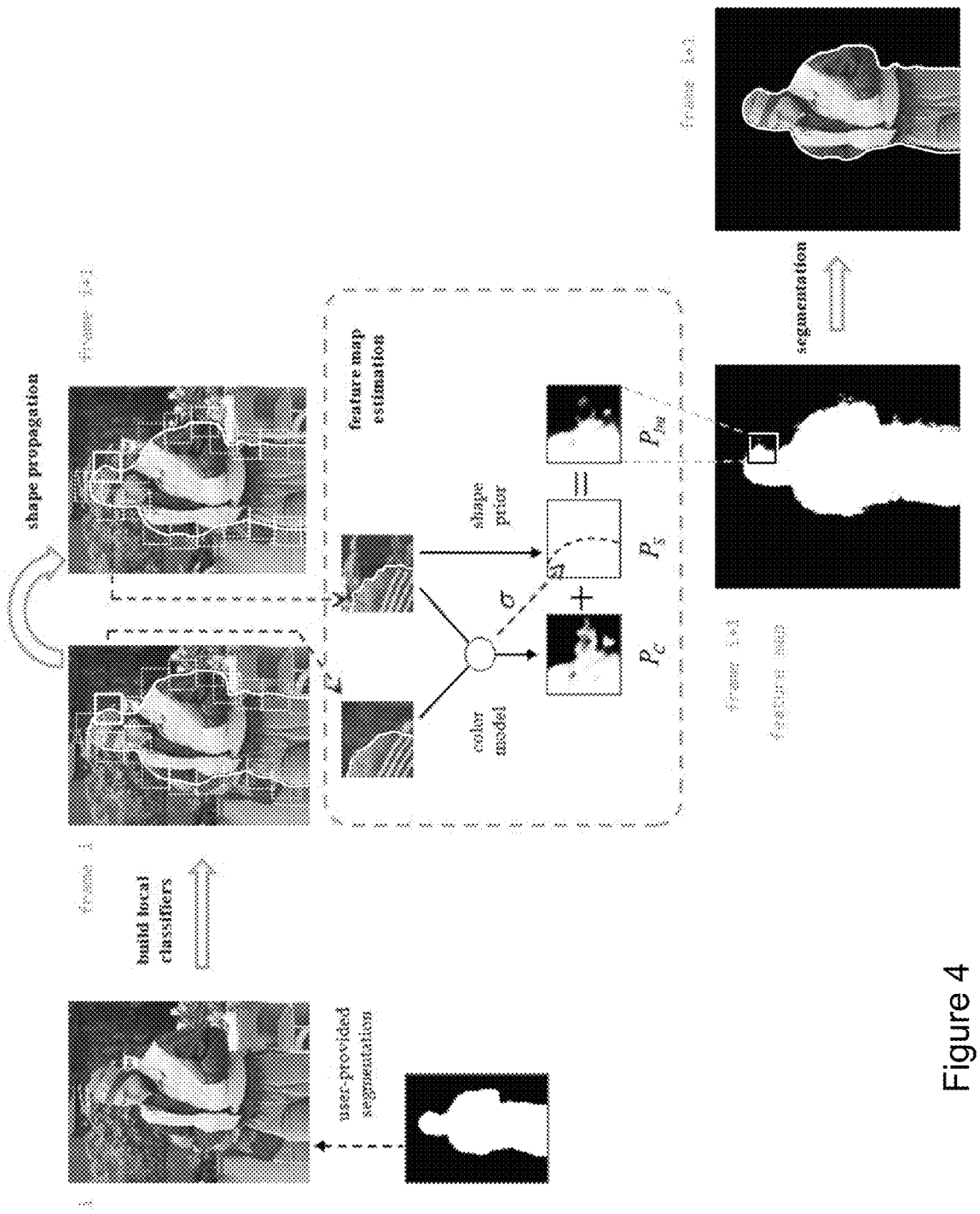
FIG. 4 is a high level diagram of an exemplary single frame propagation approach to automatic image segmentation, according to one embodiment.

In one set of embodiments, referred to as one-frame-propagation model embodiments, each frame's segmentation contour, i.e., the boundary between the background and the foreground, may determined based on that of the previous frame. FIG. 4 is a high level diagram of an exemplary single frame propagation technique illustrating key concepts of the present invention, according to one embodiment. As may be seen, in this approach a user-provided segmentation of a first frame (frame i), e.g., a segmentation contour of the image, may be used to determine a segmentation shape prediction (referred to in FIG. 4 as a shape "prior") for a current image (frame i+1) via a plurality of local classifiers, represented in FIG. 4 by dotted line boxes or windows along the segmentation contours of frames i and i+1. These classifiers or windows may be used to characterize the images' color and shape attributes in local regions, specifically along the contour, which may then be used to generate multiple local feature maps that together compose a feature map of the image, also referred to as a probability map (with respect to foreground and background pixel classification), from which may be determined the contour (segmentation) of the current image or frame, as will be described in more detail below.

Figure 5:
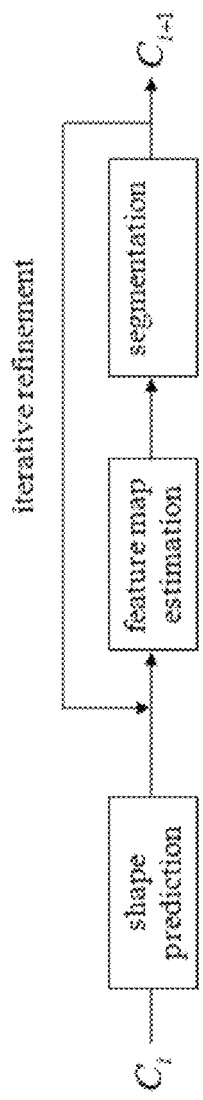
FIG. 5 illustrates an iterative aspect of the single frame propagation approach of FIG. 4, according to one embodiment.

In one embodiment, this single-frame approach may include an iterative component, as indicated in FIG. 5, where, from a contour of a frame i, denoted as $C_i$, a shape prediction is generated and used to create a feature map estimation, which in turn is used to compute a segmentation (contour) of the current frame i+1. Note that in the embodiment of FIG. 5, the feature map estimation and segmentation (computation of contour) may be iterated to refine the computed contour. For example, the computed contour from one iteration may be used to generate a refined feature map estimation, which may then be used to determine a refined segmentation or contour. This iteration may be repeated until some convergence condition is met, e.g., until the differences between successive computed contours is below some specified threshold.

Described in a slightly different manner, the single-frame-propagation model, which may be considered to be the fundamental building block of the system, transfers or transforms an object contour $C_i$ in frame i to an object contour $C_{i+1}$ in frame i+1. The basic idea is to perform a rough shape prediction to generate a predicted contour, and then refine the contour around the predicted shape. The process may involve several separate steps. For example, in one embodiment, the initial contour $C_i$ may be transformed by SIFT key point matching and optical flow. A set of local classifiers may be built or constructed along the contour to separate foreground/background pixels, where the classifiers integrate both color and shape information, e.g., of the local region of the classifier, to characterize or specify the contour in that region. The local classification results may then be combined to generate an accurate feature map of the object in frame i+1, which may be followed by a binary segmentation. This estimation-segmentation step may be repeated several times until $C_{i+1}$ converges.

In another set of embodiments, referred to as multi-frame-propagation model embodiments, segmentation information from one frame, e.g., an initial frame such as frame 1, may be used to determine segmentation for multiple subsequent frames. For example, various techniques may be used to robustly track the windows/classifiers as they are propagated through successive frames. An exemplary embodiment of such a multi-frame propagation model is illustrated in FIG. 6, where, as may be seen, a segmentation of frame 1 (or i), represented by the mask of frame 1 in the figure, may be used to propagate a segmentation contour from frame 1 to a subsequent frame 2 (or i+1), similar to the single-frame approach described above with respect to FIG. 4, possibly including an iterative process as indicated by the "iterate" denotations above frames 2 and 3, and as described above with reference to FIG. 5. As FIG. 6 indicates, in this embodiment, once the segmentation of frame 2 (i+1) is determined, this segmentation information may be used to determine the segmentation (contour) of the subsequent frame, e.g., frame 3 (i+2), and so on. Note, however, that in some embodiments, along with the segmentation information from the previous frame, information from the initial frame may also be used, e.g., a color map or other segmentation-related information, as will be discussed in more detail below.

Figure 7:
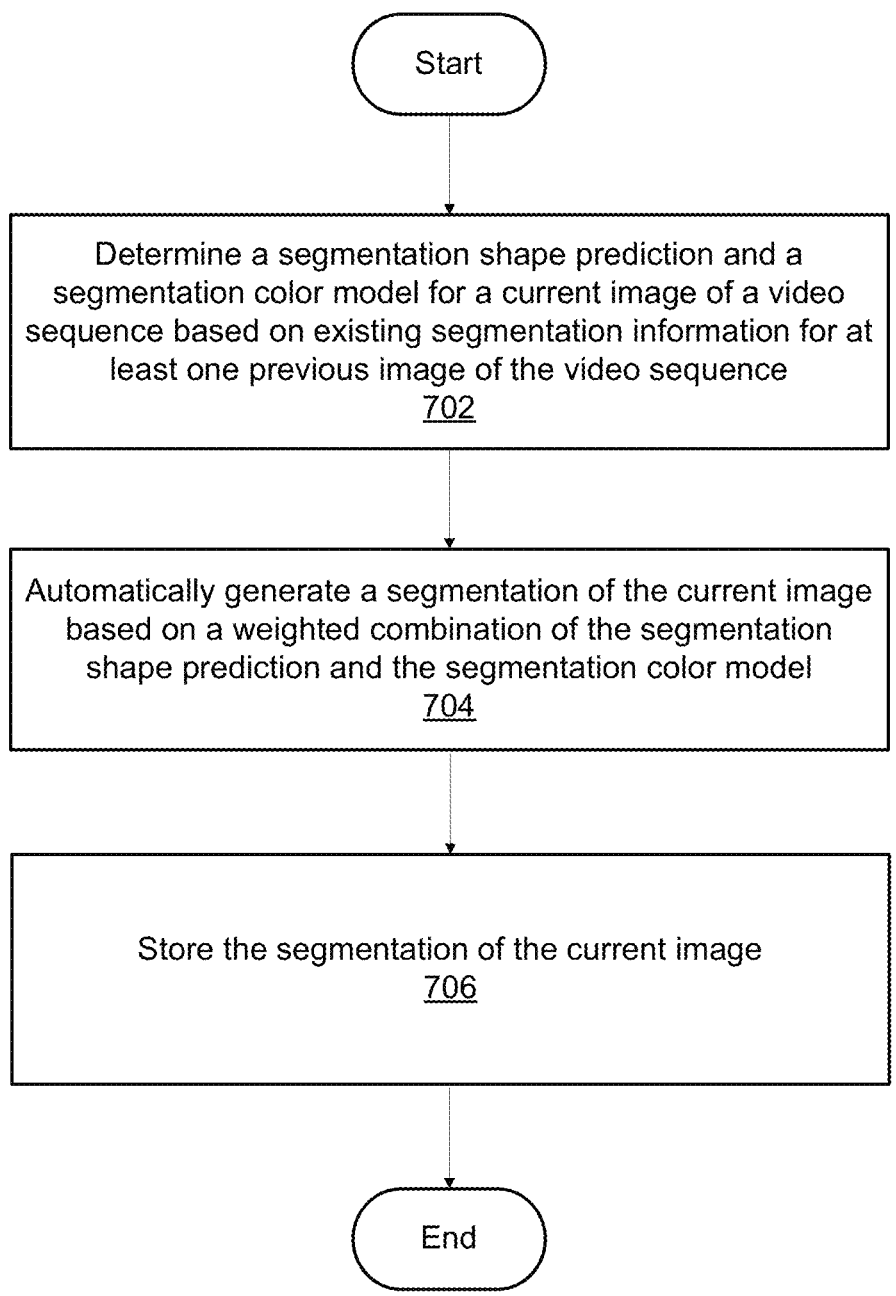
FIG. 7 is a flowchart illustrating a method for performing automatic segmentation of images in a video sequence, according to one embodiment.

FIG. 7—Flowchart of a Method for Performing Automatic Image Segmentation in a Video Sequence FIG. 7 is a flowchart illustrating a method for automatically determining segmentation in a digital video sequence. The method shown in FIG. 7 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 702, a segmentation shape prediction and a segmentation color model for a current image (e.g., a first image) of a video sequence may be determined based on existing segmentation information for at least one previous image of the video sequence. For example, in one embodiment, a user may manually segment the current image into a foreground and a background, storing the segmentation information for this current image, including a segmentation contour that divides the background from foreground, e.g., a foreground object, in the image.

The determination of the shaped prediction and color model may be performed via any of a variety of techniques, as desired. For example, regarding shape prediction, in one embodiment, scale invariant feature transform (SIFT) techniques may be employed to generate an estimate or rough version of the segmentation contour for the current image based on the at least one previous image of the sequence, i.e., based on the pre-existing segmentation contour. SIFT key points are reliable features for consecutive frames in videos. By matching the SIFT key points of the previous image/frame with corresponding key points in the current image/frame, one can determine a good initial guess of the contour in the current (or new) frame. Thus, more specifically, the method may search in the current frame for a best match for each (SIFT) key point inside the foreground object of the previous frame. From the point correspondence, an affine transform (e.g., specifying translation, rotation, shearing, and possibly scaling) may be determined that transforms $\{x_j\}$ to $\{y_j\}$ (j=1, 2, ... n), e.g., in a least squares estimate sense.

Figure 8:
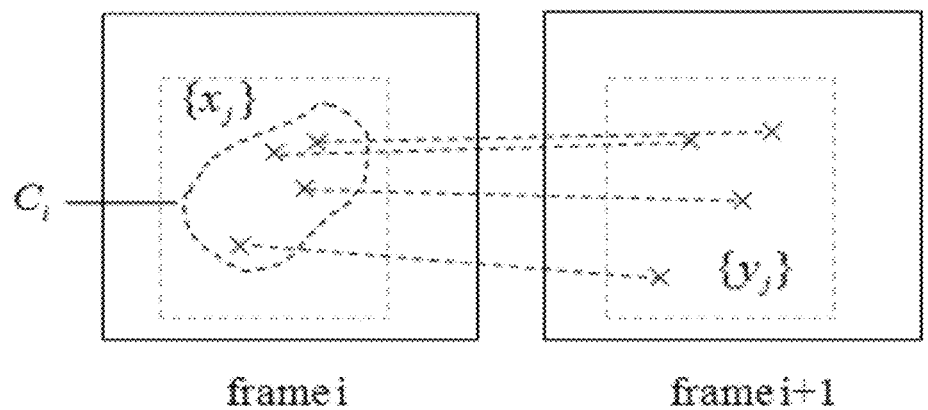
FIGS. 8 and 9 illustrate scale invariant feature transform (SIFT) of key points in consecutive video frames, according to one embodiment.

FIG. 8 shows an example of matched key points (i.e., feature points) in consecutive video frames. As shown, each key point x in frame i corresponds to a key point in frame i+1. When determining these key points, in some embodiments, for efficiency and robustness, the search range may be limited to a region enclosing the contour, e.g., a rectangle slightly larger than the bounding box of the contour, as indicated by the dashed box surrounding the object bounded by the contour $C_i$. Moreover, in some embodiments, outliers may be omitted when fitting these points.

Figure 6:
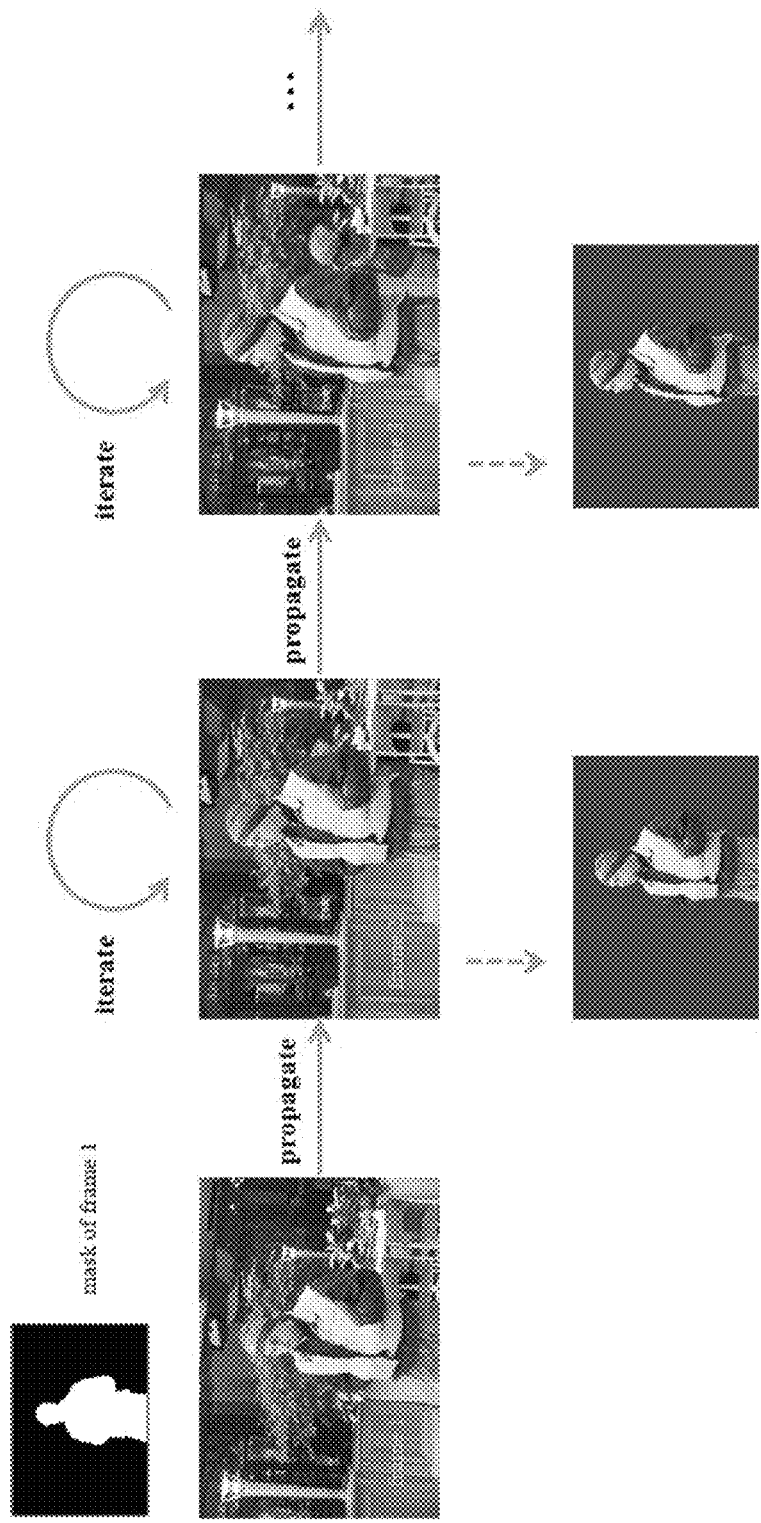
FIG. 6 is a high level diagram of an exemplary multi-frame propagation approach to automatic image segmentation, according to one embodiment.
Figure 9:
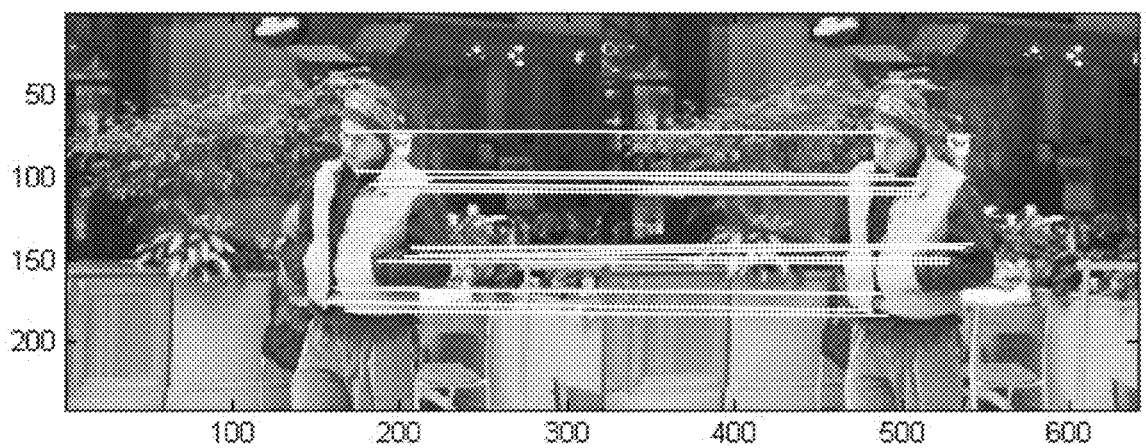

FIG. 9 illustrates such key points and their matches or correspondences in two consecutive frames of the exemplary video sequence introduced in FIG. 3 (and also used in FIGS. 4 and 6). Note that because the image changes between two consecutive frames are small, detecting and correlating the key points will generally be straightforward and quite reliable. Thus, the affine transform determined based on these points may provide ready means for generating a rough estimate of the initial contour, e.g., by propagating the contour via the transform to the next frame.

Thus, once the affine transform has been determined based on the matching key points in the two frames, the initial contour may be transformed to generate a rough estimate or predicted shape of the contour for the subsequent frame. As mentioned above, in some embodiments, a plurality of local classifiers may be constructed along the contour and used to perform operations with respect to the contour. For example, in some embodiments, a sliding window approach may be employed, where each classifier, whose center point lies on the contour, defines and operates on a local region around a respective contour point (the classifier's center), integrating color and shape information from the previous frame, e.g., a color model and a shape prediction, and determining the predicted contour accordingly. In one embodiment, the classifiers, represented in FIG. 4 as small rectangles along the segmentation contour of frames i and i+1, may be defined such that every point in the contour is covered by (e.g., contained by) at least two classifiers. Thus, each classifier box or window preferably overlaps at least two other classifiers. In other words, the respective region of each local classifier of the plurality of local classifiers overlaps the respective regions of at least two other local classifiers of the plurality of local classifiers Thus, the shape alignment process may operate to roughly align the classifier windows with the foreground object in frame i+1.

Note that in prior art approaches, color models are generally constructed for the entire foreground object and the background, which may be of limited relevance to specific local regions of the foreground and background. As described above, in some embodiments, determining the segmentation shape prediction and the segmentation color model may include constructing a plurality of local classifiers for the at least one previous image, where each local classifier includes a respective region of the at least one previous image that contains a respective portion of a shape contour of the at least one previous image, and where the plurality of local classifiers cover the shape contour of the at least one previous image. Then, for each local classifier of the plurality of classifiers, a local segmentation shape prediction for the current image may be generated based on the respective portion of the shape contour of the at least one previous image contained in the local classifier.

More specifically, in some embodiments, generating a local segmentation shape prediction based on the respective portion of the shape contour may include generating an initial local segmentation shape prediction via scale invariant feature transform (SIFT) applied to a plurality of key points in the respective region, and generating the local segmentation shape prediction by refining the estimate of the initial local segmentation shape prediction using optical flow applied to points along the respective portion of the shape contour. In one embodiment, generating the local segmentation shape prediction by refining the estimate of the initial local segmentation shape prediction using optical flow applied to points along the respective portion of the shape contour may include determining a local average flow vector based on optical flow of foreground pixels in the respective region, and applying the local average flow vector to the points along the respective portion of the shape contour to generate the local segmentation shape prediction.

Finally, a local segmentation color model may be generated based at least on color information for the respective region of the at least one previous image included in the local classifier. Thus, the use of local classifiers to characterize and operate on local regions of the image may significantly enhance the accuracy and results of segmentation, particularly regarding images with complex foreground objects and/or backgrounds.

Figure 10:
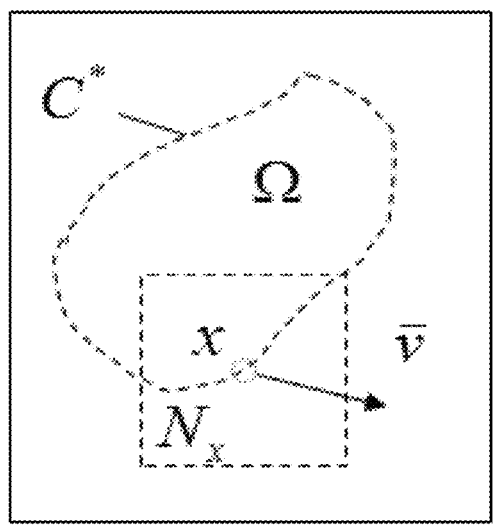
FIG. 10 illustrates optical flow of a contour point in a video frame, according to one embodiment.

While applying the transform to each point on the contour (or some specified subset of such points, such as equally spaced sample points along the contour) will generate a rough estimate of the contour that approximately aligns the contour to the image of the subsequent frame, this transformation generally captures the object's principle rigid motion between the two frames, and thus may generally omit motion effects specific to local motion of parts of the object. To determine a better prediction of the contour, optical flow of contour pixels between the transformed frame and the next frame may be computed. However, due to the unreliability of optical flow on the boundary, e.g., where occlusion occurs, directly adding the flow vector to the contour points, i.e., at the pixel level, may produce erratic results. Thus, in on embodiment, rather than computing the optical flow based on the contour points themselves (using the center point per classifier), a local average flow inside the contour may be used. For example, turning now to FIG. 10, let x be a point on the transformed contour $C^*$. $\Omega$ is the inside region of $C^*$, and $N_x$ is a local classifier or window centered at x. Now, point x is moved by the average flow vector $\bar{v}$ in region $\Omega \cap N_x$, i.e. $x'=x+\bar{v}$. In other words, the flow vector applied to x is the average of the flow vectors of all points that are in both the inner region $\Omega$ and the classifier window, i.e., that are in the intersection of these two point sets. This regional or local average optical flow is much more robust than that generated from single points, primarily due to the fact that the object's motion is generally locally smooth. By incorporating local averaged optical flow into the process, a more accurate and robust estimated contour may be generated.

Figure 11:
FIG. 11 illustrates prediction of a segmentation contour in successive video frames, according to one embodiment.

Thus, from these two steps (transformation/alignment plus average optical flow), one may generate a prediction of the contour, or, more accurately, a plurality of predicted or estimated contour portions or segments, each covered by and associated with a respective classifier. This predicted or estimated contour may then be used as a shape prior (shape prediction) and may specify positions of the local classifiers. FIG. 11 illustrates a first frame (labeled frame 1) with user provided segmentation indicated by a white contour line around the foreground object, and a second frame (labeled frame 2) with the contour after alignment and optical flow. Note that the contour in frame 2, which corresponds to frame i+1 of FIG. 4, is very similar to the original contour (of frame 1), but is still not perfect, being an estimate or prediction. However, this contour, specifically, the contour segments composing the contour, may be used by the classifiers in determining an even better contour, as will now be described.

Building Local Classifiers

Figure 12:
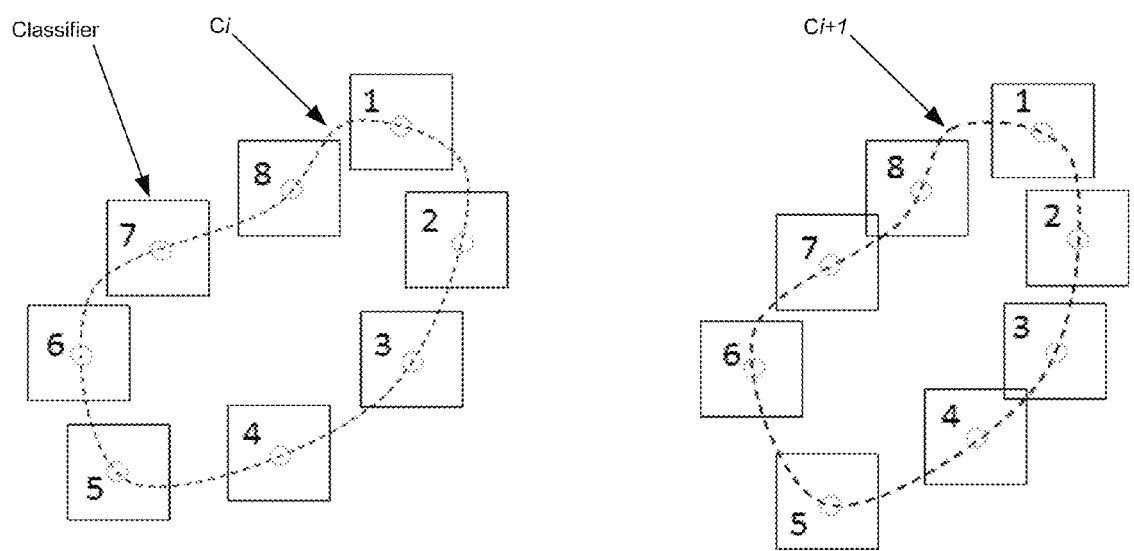
FIG. 12 illustrates local classifiers in successive video frames, according to one embodiment.

As noted above, in some embodiments, local classifiers may comprise a set of sliding windows along the contour. In one exemplary embodiment, the typical size of a classifier box or window may vary from 50×50 to 70×70 pixels in size, although any other sizes may be used as desired. In one embodiment, the centers of these windows may be equally spaced sample points along the contour $C_i$, as shown in FIG. 12 (note that for illustration only a few non-overlapping windows are shown). As also noted above, the number of windows may be set such that each point near the contour is covered by at least two windows. As described above, the centers of these overlapping windows may be transformed and (average optically) flowed into the next frame together with the contour. In other words, each of the classifiers, along with their respective contour segments or portions, may be propagated from frame 1 to frame 2 via shape alignment and local average optical flow, thus resulting in two sets of sliding windows or classifiers with one-to-one correspondence, denoted as $\{W_k^i\}$, $\{W_k^{i+1}\}$, k=1, 2, ... N . In the below description, pairs of these two sets of classifiers may referred to as first and second classifiers for convenience. Said another way, a plurality of local classifiers for the current image corresponding to the plurality of local classifiers for the at least one previous image may be generated by applying the average flow vector to the plurality of local classifiers for the at least one previous image, wherein each local classifier for the current image comprises a respective region of the current image that contains a respective portion of a shape contour of the current image, and wherein the plurality of local classifiers of the current image cover the shape contour of the current image.

Per FIG. 12, given the labeled pixels in $W_k^i$ (first classifier), the pixels in $W_k^{i+1}$ (second classifier) may be classified as foreground or background pixels based on their strong temporal correlation in color and shape. In other words, for each classifier, given the strong correlation between the shape and color of frame i and frame i+1, the classification of pixels of frame i (as foreground or background) may be used to classify those of frame i+1.

Figure 13:
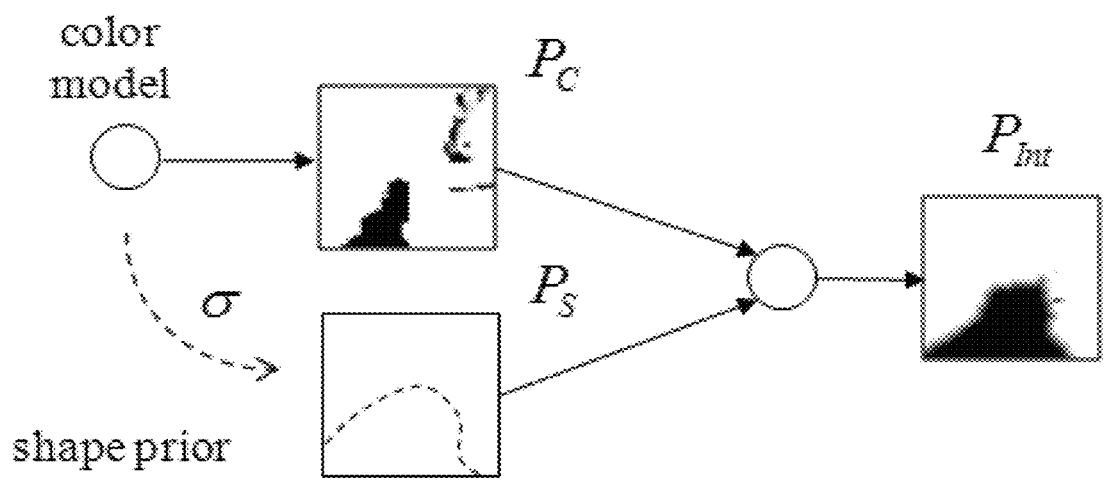
FIG. 13 illustrates local color and shape integration with adaptive weights, according to one embodiment.

FIG. 13 illustrates color and shape integration with adaptive weights, according to one embodiment. In this exemplary embodiment, a color model and predicted shape (shape prior) for a particular local classifier are combined based on confidence levels pertaining to their respective background or foreground characterizations to generate a resultant feature map for the local region of the classifier. For example, as FIG. 13 indicates, based on a measure of the discriminativity of the color model for the classifier, denoted by σ, the contributions of the shape prior and the color model, denoted by $P_c$ (foreground probability based on the color model) and $P_s$ (foreground probability based on the shape prior) may be weighted and summed to generate an integrated probability (feature) map denoting foreground and background likelihoods for the pixels of the classifier. Said another way, the color and shape clues may be fused with adaptive weights depending on the discriminativity of the color model. The practical rule embodied in this process may be stated thusly: when colors are separable, trust colors; otherwise trust the shape. In other words, if the color model for the classifier makes a clear distinction between foreground colors and background colors, rely on the color model to classify the pixels of the region, and if the color model does not make a clear distinction, rely more on the shape prior to classify the pixels. In some embodiments, this approach may be considered to be a type of fuzzy logic pixel classification scheme, where color models and predicted shapes are used as appropriate to classify pixels as foreground or background pixels. More details regarding this process are provided below.

Determining the Color Model

One approach to calculating the foreground probabilities for the pixels in a propagated classifier $W_k^{i+1}$ is via a Gaussian Mixture Model (GMM). In this approach, all the pixels in the local region or window of the second classifier are sampled except for a narrow band around the contour, which in some embodiments may be defined by ($|d|<\Delta$), where $\Delta$ is the width of an uncertainty band in the first classifier, and where $d_x$ is the maximum distance of a pixel x from the contour in the classifier. In other words, pixels near the estimated contour are more difficult to classify as foreground or background pixels because the estimated or predicted contour almost certainly has come error, and so pixels near the estimated contour on the FG side may actually be on the BG side of the actual (unknown) boundary, and vice versa.

Figure 14:
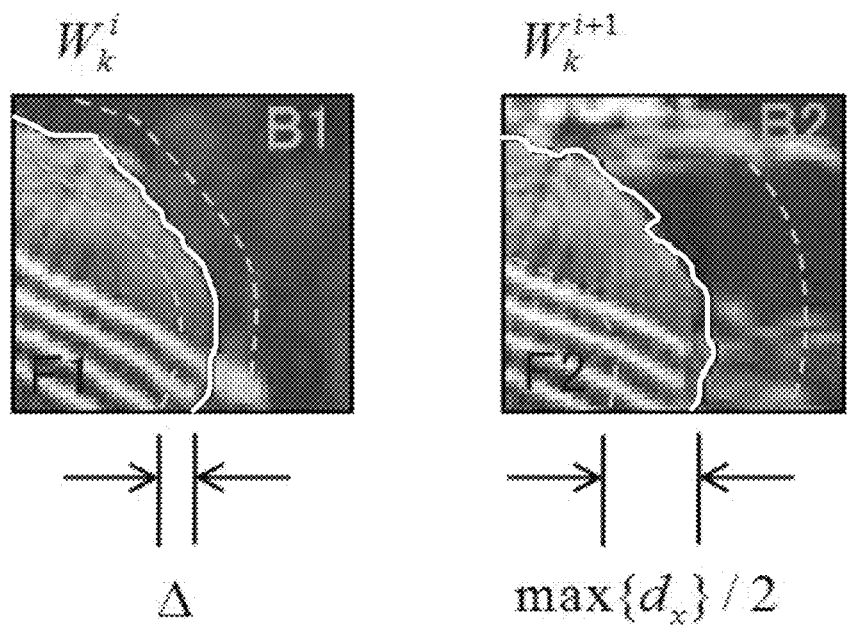
FIG. 14 illustrates candidate local color models, according to one embodiment.

FIG. 14 illustrates regions for correlated classifiers, e.g., first and second classifiers, $W_k^i$ and $W_k^{i+1}$, where each region is divided into respective foreground and background sub-regions. More specifically, the first classifier is divided into a foreground F1 and a background B1, and the second classifier is divided into a foreground F2 and a background B2, as shown. The sampled pixels from the first classifier may be denoted by $\{F_1; B_1\}$. In some embodiments, to make a richer color model, colors in the second classifier may also be sampled. Note that because the predicted contour is not always accurate, the uncertainty band in the second classifier is wider than that of the first classifier, and thus the sampled pixels, denoted by $\{F_2; B_2\}$, are further from the contour, where their FG/BG status is more reliable. More specifically, $$F_2 = \{x | d_x > \max\{d_x\}/2\},$$

and $$B_2 = \{x | d_x < \min\{d_x\}/2\},$$

where $d_x$ is the signed distance transform from the contour, with foreground being the positive side. Note that the particular criteria for the sampled pixels and uncertainty bands presented herein are meant to be exemplary only, and that other values, constants, and relationships may be used as desired.

In the case of very large inter-frame motion, the tentative sampling in $W_k^{i+1}$ may be inaccurate. For example, the pixels demarcated as $\{F_2, B_2\}$ may both be on the foreground or the background side of the region, i.e., the contour prediction the pixels are segregated by may be so inaccurate that the actual contour is not even in the region, in which case the $\{F_2, B_2\}$ pixels should not be used. Thus, criteria may be set or specified to determine whether or not to include $\{F_2, B_2\}$ in the determination of the color model. Two candidate color models may be built:

Simple model: $\{F_1, B_1\}$
Mixture model: $\{F_1, B_1; F_2, B_2\}$.

Assuming the foreground does not considerably change (foreground bias), one may expect that adding $\{F_2; B_2\}$ will reduce the misclassification in $W_k^{i+1}$ (e.g., background pixels classified as foreground or vice versa). This can be verified simply by counting the number of pixels whose probabilities are larger than 0.5. for each model, and the model that results in a smaller number adopted for use.

In one embodiment, 6-components (e.g., 3 for foreground colors and 3 for background colors) may be used to train the GMM. The final foreground probabilities may be normalized via a log scale, i.e.:

$$P_C(x) = \frac{\log P_B(x)}{\log P_F(x) + \log P_B(x)}, x \in W_k^{i+1}.$$

Figure 15:
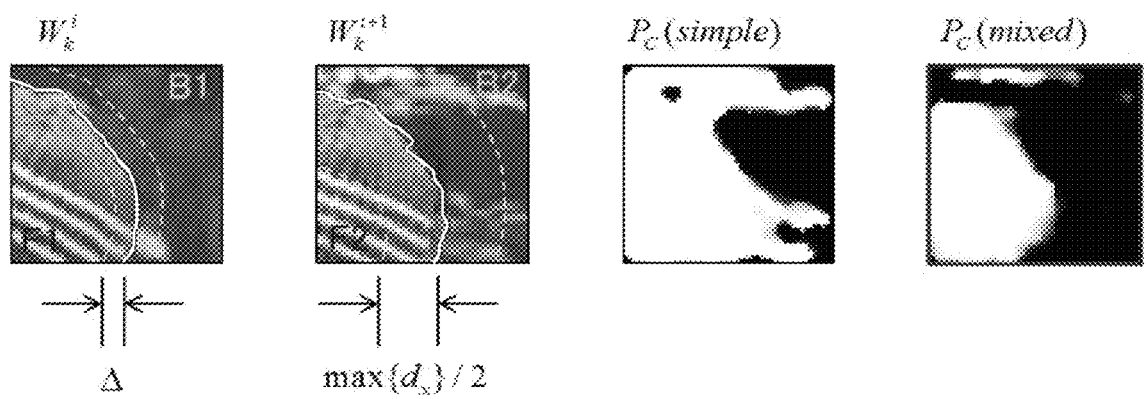
FIG. 15 illustrates use and results of the two candidate color models of FIG. 14, according to one embodiment.
Figure 15:
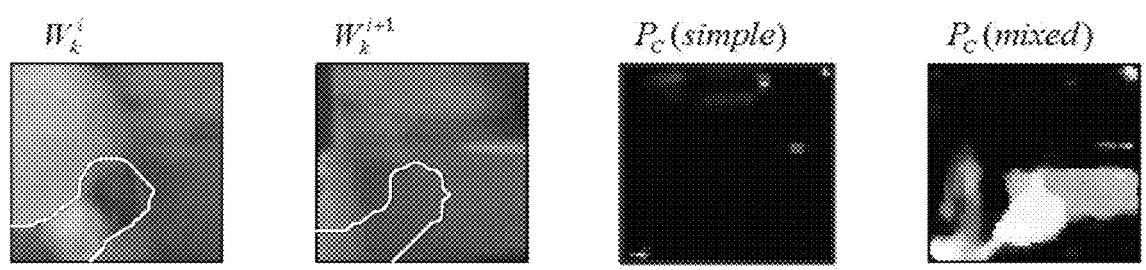

FIG. 15 illustrates exemplary differences resulting from the use of the two candidate color models, e.g., the mixed color model, based on pixels from both classifiers $\{F_1, B_1; F_2, B_2\}$, and the simple color model, based only on pixels from the first classifiers $\{F_1, B_1\}$. In the upper row, the classifier regions of FIG. 14 are used, where as may be seen, the probability map generated by the mixed model is significantly less ambiguous than that generated by the simple model, i.e., the foreground and background are more clearly separated, and also correspond more closely to the second image. Thus, in this case, the mixed color model should be used. In the bottom row, the second frame doesn't have a foreground portion, but the predicted contour still indicates one. Note that the probability map using the mixed color model doesn't correspond with the second image (because the foreground changed so much), whereas the probability map using the simple color model correctly reflects the absence of foreground pixels, and so in this case, the simple color model should be used.

Summarizing the above, in some embodiments, generating a local segmentation color model may include generating a local segmentation simple color model based on color information for the respective region of the at least one previous image included in the local classifier for the at least one previous image, and generating a local segmentation mixed color model based on color information for the respective region of the at least one previous image included in the local classifier for the at least one previous image and color information for the respective region of the current image included in the local classifier for the current image. Discriminability of the local segmentation mixed color model and the local segmentation simple color model may be determined. Generating a local segmentation color model based at least on color information for the respective region of the at least one previous image included in the local classifier may then include selecting the local segmentation simple color model as the local segmentation color model if the local segmentation simple color model has greater discriminability than the local segmentation mixed color model, and selecting the local segmentation mixed color model as the local segmentation color model if the local segmentation mixed color model has greater discriminability than the local segmentation simple color model.

Shape Prior

As discussed above, in addition to the color model, a shape prior, i.e., a predicted shape, may also be used to generate the probability or feature map for a classifier region. More specifically, the contribution from the predicted shape (as part of a weighted sum) may be based on the discriminability of the color model, where if the color model makes a clear distinction between foreground colors and background colors, the color model is relied on to classify the pixels of the region, and if the color model does not make a clear distinction, the shape prior is relied on to classify the pixels, with intermediate situations addressed by weights applied to each, e.g., where the weights sum to some normalized value, e.g., 1. In other words, in some embodiments, the weights are coefficients in a linear sum of the color and shape contributions. Note, however, that in other embodiments, the shape and color contributions may be determined by a non-linear combination.

Figure 16:
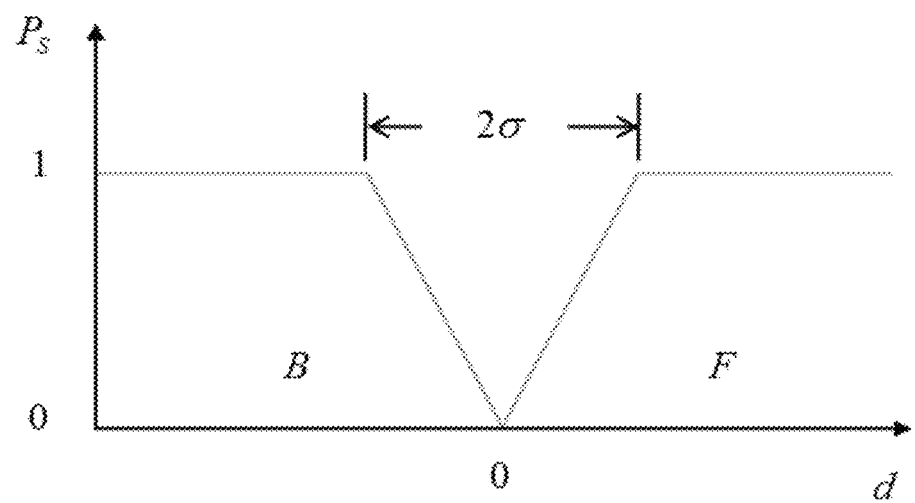
FIG. 16 illustrates shape prediction confidence, according to one embodiment.

FIG. 16 illustrates shape prediction confidence, according to one embodiment. More specifically, FIG. 16 illustrates an exemplary relationship between the confidence of pixel classifications based on the predicted contour and the contribution of the predicted shape probability map to the integrated probability map discussed above, e.g., in a weighted linear sum of the color and shape contributions. As FIG. 16 shows, in this embodiment, for each pixel, the weight applied the shape contribution, represented by the $P_S$ axis, ranges from zero to 1, i.e., ranging from no contribution to being the only contribution, depending on the distance of the pixel from the estimated contour, represented by the d axis. As discussed above, the contributions from the color model and the predicted shape may be complementary, such that as one increases, the other decreases. Note that according to the plot of FIG. 16, a d value of 0 means that the pixel is (at least approximately) on the contour, and thus there may be maximum uncertainly as to which side (FG or BG) of the (actual) contour the pixel is on based on the predicted shape, and so the weight applied to the shape prediction will be zero. Moreover, the classification of pixels with positions sufficiently removed from 0 (in either direction), i.e., deep in the FG or BG portions of the region, may be reliably made via the predicted shape, giving a weight of 1. Expressed mathematically: Let $M_k$ be the binary (foreground) mask enclosed by $C_{i+1}$, i.e.:

$$M_k(x) = \begin{cases} 1, d_x \geq 0 \\ 0, d_x < 0 \end{cases}.$$

A shape confidence term (weight) $P_S$ may be defined as:

$$P_S(x) = \begin{cases} \frac{|d_x|}{\sigma}, |d_x| \leq \sigma \\ 1, |d_x| > \sigma \end{cases},$$

where $\sigma$ is the parameter controlling the blurry width of the shape, i.e., an uncertainty band with respect to the predicted shape, i.e., the estimated contour, where, as noted above, $\sigma$ denotes the discriminability of the color model. In other words, the value of $\sigma$ depends on the separation or discriminability of foreground and background in the color model, and this value is used to blur the contour of the predicted shape, such that the more reliable the color model is, the less clear the predicted shape is regarding the contour. Thus, as one considers pixels further from the estimated contour, the predicted shape is increasingly relied on to classify the pixels as FG or BG pixels, and conversely, for pixels increasingly near the estimated contour, the color map is increasingly relied upon, where the width and rate of the switchover is specified by $\sigma$, as FIG. 16 shows. Of course, it should be noted that other embodiments may integrate the color and shape contributions in different ways, as desired.

Color and Shape Integration

Figure 17:
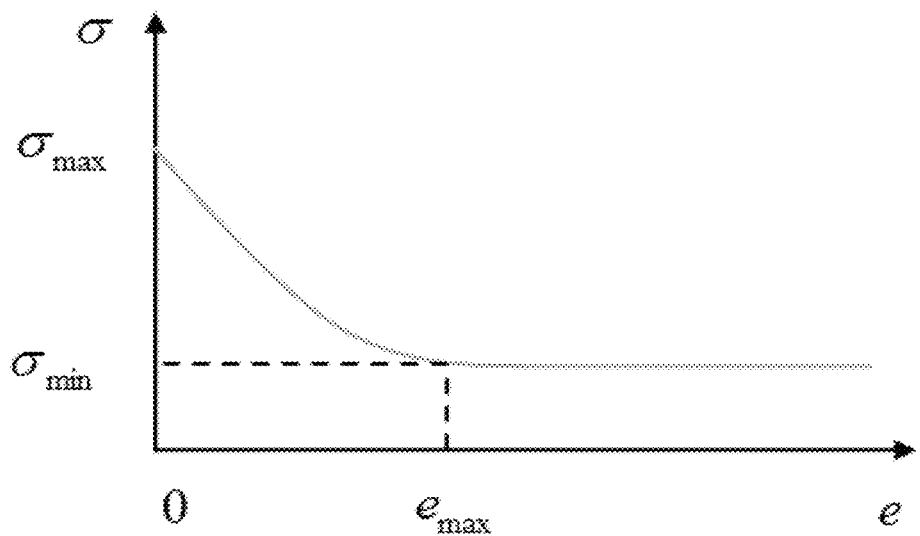
FIG. 17 illustrates shape prediction constraints based on discriminativity of the color model, according to one embodiment.

FIG. 17 illustrates shape prediction constraints based on discriminativity of the color model, according to one embodiment. As noted above with respect to FIG. 16, the blurry width $\sigma$ is related to the discriminativity of the color model. When foreground and background colors are separable, $\sigma$ is large and the shape constraint is loose, i.e., the blurred band in the predicted shape probability map is wider; when FG and BG colors are mixed, $\sigma$ becomes small and the shape constraint is tight, i.e., the blurred band in the predicted shape probability map is thinner.

In one embodiment, classification error may be used as the measure of color discriminativity. For example, let $L_k$ be the predicted label (F=1, B=0) of $W_k^i$ from the color model. The classification error e is the sum of misclassifications, weighted by the distance to the contour:

$$e = \frac{\int_{W_k^i} |L_k(x) - M_k(x)| \cdot \omega(x) dx}{\int_{W_k^i} \omega(x) dx},$$

where $$\omega(x) = \exp\left(-\frac{d_x^2}{2\sigma_d^2}\right).$$

As shown in FIG. 17, $\sigma$ is a decreasing function of e:

$$\sigma = \begin{cases} \sigma_{min} + a(e - e_{max})^r, & 0 \leq e \leq e_{max} \\ \sigma_{min}, & e > e_{max} \end{cases}, \text{ where}$$

-continued $$a = \frac{\sigma_{max} - \sigma_{min}}{e_{max}^r}.$$

Said another way, once the color map for frame i+1 is determined (as described above), it may be used to (re)classify the pixels of frame i (whose actual classifications are already known, since that image has already been segmented), and by determining the errors due to the color model, determine the confidence or reliability of the color model, i.e., to determine σ. In other words, once the error e is computed, σ may be computed therefrom. Note that per the expression above, bounds may be put on the values of σ, specifically, $\sigma_{min}$ and $\sigma_{max}$.

In one exemplary implementation, $e_{max}$=0.12, $\sigma_{max}$=1, $\sigma_{min}$=2, and r=2.1 is the size of $W_k^i$, and, as mentioned above, the final probability is a weighted linear combination of color and shape priors:

$$P_{int}(x) = P_S(x)M_k(x) + (1 - P_S(x))P_C(x)$$

Thus, as indicated in FIG. 17, the minimum discriminability of the color model $\sigma_{min}$ may correlate with the maximum error with respect to the color model, and may define the point at which the shape prediction is the dominant contributor.

Figure 18:
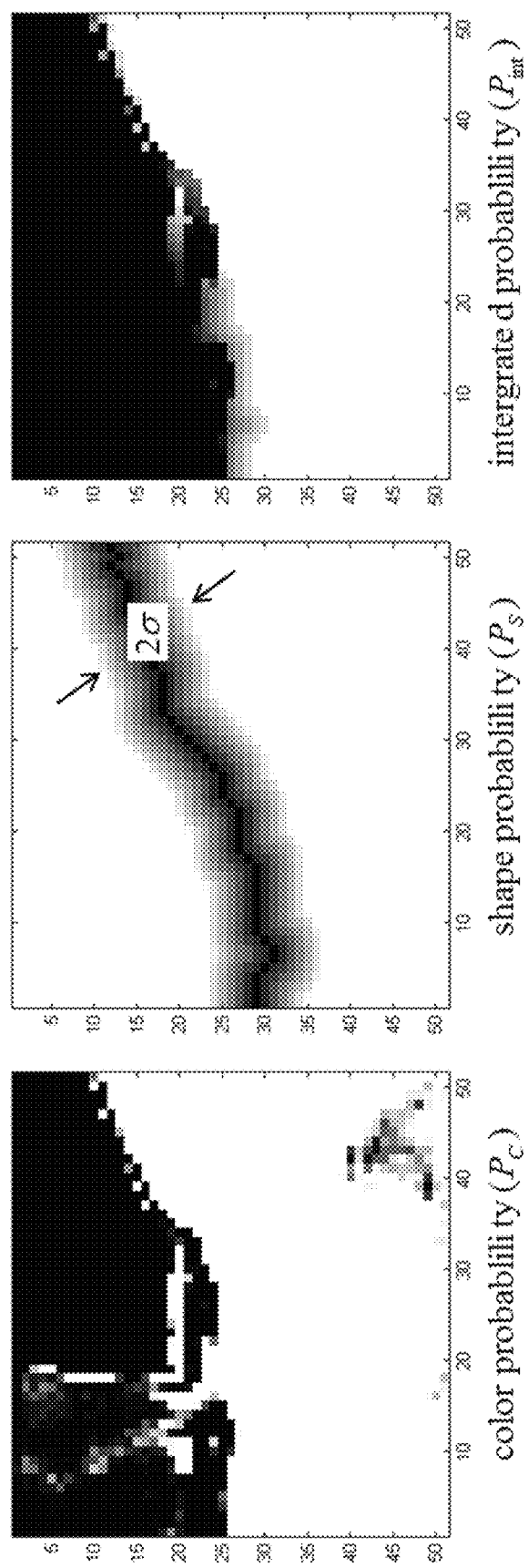
FIG. 18 illustrates color and shape integration, according to one embodiment.

FIG. 18 illustrates color and shape integration, according to one embodiment. More specifically, FIG. 18 illustrates exemplary color and shape probability maps (i.e., feature maps), $P_c$ and $P_s$, and a corresponding integrated probability map $P_{int}$ for a classifier (region). Note that the integrated probability or feature map is a more accurate and precise estimate of the contour than either of the color or shape maps. Thus, by using embodiments of the above techniques, each classifier may determine a probability or feature map for a respective portion of the image proximate to the estimated contour.

Combined Feature Map

In one embodiment, the probabilities (i.e., probability or feature maps) in all local windows, i.e., from all local classifiers, may be combined to form a combined feature map. For example, for each local classifier of the plurality of classifiers, a local feature map estimation may be generated based on a weighted combination of the local segmentation shape and the local segmentation color model for the local classifier, where the local feature map estimation classifies pixels in the respective region as background or foreground pixels. Then, a feature map estimation for the current image may be generated by combining the local feature map estimations.

If a pixel is covered by multiple windows, its respective probability (classification) may be determined from a weighted linear combination of values in different windows, i.e., from different classifiers, e.g.:

$$P(x) = \frac{\sum_k P_{int}(x - c_k)\omega_k}{\sum_k \omega_k}$$

$$\omega_k = (|x - c_k| + \varepsilon)^{-1},$$

where $c_k$ is the center of $W_k^{i+1}$, k sums over all the windows that cover x, and s is a small constant. In other words, for a pixel or point x, the weights applied to the corresponding probability values from each of the overlapping probability or feature maps from the classifiers in the linear sum may be based on the distance of x from the center point of each classifier window. Of course, this above combination scheme is but exemplary only, and is not intended to limit the techniques used to combine the local feature maps to any particular approach.

Thus, a combined probability or feature map for the image (e.g., of frame i+1) may be determined using both color models and shape predictions for each of a plurality of local classifiers. Said another way, a plurality of local feature maps, e.g., foreground masks, may be stitched together to form a global or combined feature map or mask.

In 704, a segmentation of the current image may be automatically generated based on a weighted combination of the segmentation shape prediction and the segmentation color model, as described below.

Segmentation

In one embodiment, the combined feature (probability) map may be used to segment the image (into foreground and background portions). For example, in one embodiment, the combined feature map (i.e., the generated feature map estimation for the current image) may be used to segment the image using an image processing algorithm such as Graph Cut, where the probability values may be set as data cost, after which a GAC (Geodesic Active Contour) algorithm may be performed to further regularize the boundary, e.g., implemented by level sets. Note, however, that any other algorithms and/or tools may be used as desired.

In an alternative embodiment, rather than generating a combined feature map, then segmenting the image according to the combined feature map, the local feature maps may each be used to perform a local segmentation for each classifier window, after which these local segmentations (segmented image portions) may be stitched together to form the segmented image.

Iterative Refinement

Figure 19:
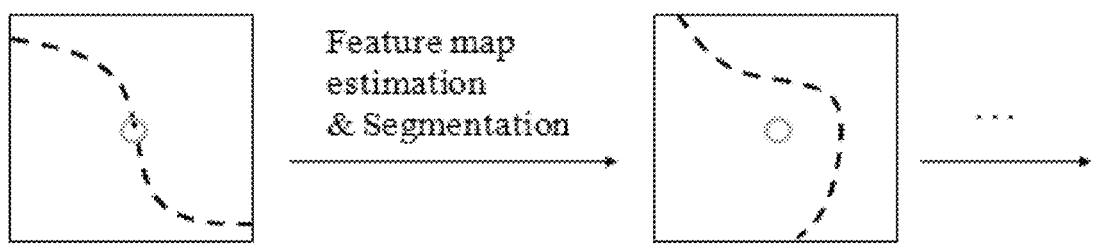
FIG. 19 illustrates contour iteration with respect to feature map estimation and segmentation, according to one embodiment.

In some embodiments, portions of the above techniques may be repeated in an iterative manner to further refine the segmentation. For example, using the segmentation boundary as an initial contour, the feature map estimation and segmentation process described above may be repeated to produce a more accurate result. In one embodiment, during iterations, the windows or classifier regions may be fixed, i.e., only the contour inside (the local foreground portion of the classifier region) may be updated. For each iteration, different color samples may be selected, and the current contour may be used as the shape prior or predicted shape. Local results may then be combined for segmentation. The iterations may terminate when the local classifier's contour does not change any more, e.g., within some specified tolerance, e.g., up to a few (10-20) pixels. FIG. 19 illustrates contour iteration with respect to feature map estimation and segmentation, according to one embodiment. As may be seen, after the feature map estimation and segmentation, the original (estimated) contour, which passes through the center point of the classifier region, is moved to the right of the center. This contour may then be used for the next iteration, i.e., for the next feature map estimation and segmentation. Said another way, automatically generating a segmentation of the current image produces a shape contour for the current image, and the method may include iteratively performing the above-described determining the segmentation shape prediction and segmentation color model and automatically generating a segmentation of the current image, until the shape contour for the current image converges, where the segmentation of the current image for each iteration is used as the segmentation information for the next iteration.

Typically, different classifiers (windows) converge at different speeds. Thus, at the end of each iteration, the converged classifiers may be marked, and only the unmarked classifiers may be updated in future iterations. As noted above, the iterations may be performed until all classifiers converge, or until it is determined that convergence will not occur, in which case the user may intervene, e.g., by manually segmenting the image, as will be discussed below in more detail.

In 706, the segmentation of the current image may be stored, e.g., in a memory medium of the computer system 100, and/or a memory medium coupled to the computer system, e.g., over a network, e.g., a SAN. The method may then repeat the above-described method elements for subsequent images or frames of the video sequence, as described below in more detail. In other words, the determining a segmentation shape prediction and a segmentation color model for a current image of a video sequence, the automatically generating a segmentation of the current image, and the storing of the segmentation of the current image, may be repeated for one or more contiguous images in the video sequence.

In one embodiment, storing the segmentation of the current image may include storing the information describing or specifying the segmentation of the image, e.g., for subsequent use in processing the image, e.g., for special effects, etc. In other embodiments, the segmented image itself may be stored.

Multi-Frame Propagation

A simple concatenation of the single-frame-propagation techniques described above may result in significant inaccuracies, since the error accumulates from frame to frame. Two approaches to effectively control or ameliorate the error divergence are described below. The first approach is to constantly rely on the color samples in the first frame. Thus, while the single-frame propagation approach forms the fundamental basis of the automatic segmentation techniques disclosed herein, in some embodiments, this approach may be extended and modified to form a multi-frame propagation process where color information for an initial frame is used to automatically perform segmentation for multiple subsequent frames.

Figure 20:
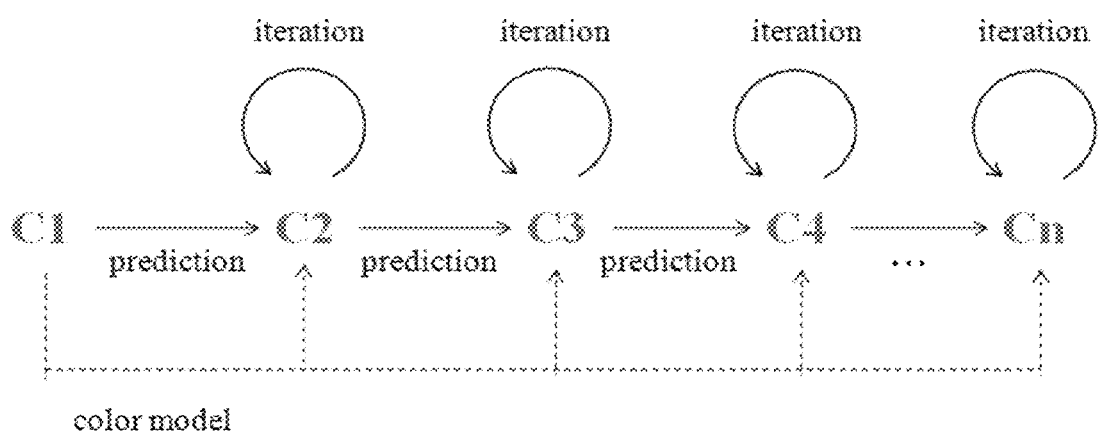
FIG. 20 illustrates multi-frame propagation of segmentation using a color model of an initial frame, according to one embodiment.

FIG. 20 illustrates multi-frame propagation of segmentation using a color model of an initial frame, according to one embodiment. As FIG. 20 indicates, a first frame C1 is used to generate a sequence of subsequent contours or segmentations, specifically, for subsequent frames C2-Cn. As may be seen, the color model for the initial frame (C1) is used for each of the subsequent frames, while shape information, e.g., a shape prediction, for each frame is used for the next frame. In other words, the automatic segmentation of each frame uses the color model from the initial frame (and possibly the current frame in the "mixed model" case), but uses the predicted shape of the immediately previous frame. In other words, for determining segmentation for a frame Ci+1, instead of building a color model from Ci and Ci+1, the color model is determined from C1 (and possibly Ci+1). This scheme keeps the segmentation error at a constant level for every frame, as opposed to the simple concatenation approach where the error diverges or increases with the propagation. Note that for each subsequent frame the automatic segmentation is an iterative process, similar to the iterative refinement described above.

Said in a slightly different way, in some embodiments, for each iteration of the above iteratively performing (of the determining the segmentation shape prediction and segmentation color model and automatically generating a segmentation of the current image), upon convergence of the shape contour, the local classifier may be repositioned onto the shape contour. This repositioning may include determining a normal distance from the local classifier's center to the shape contour, and moving the local classifier onto the shape contour based at least in part on the normal distance. The determining a normal distance and the moving the local classifier may ameliorate propagation and divergence of errors. In one embodiment, local averages of the normal distance may be used to reposition each window.

Figure 21:
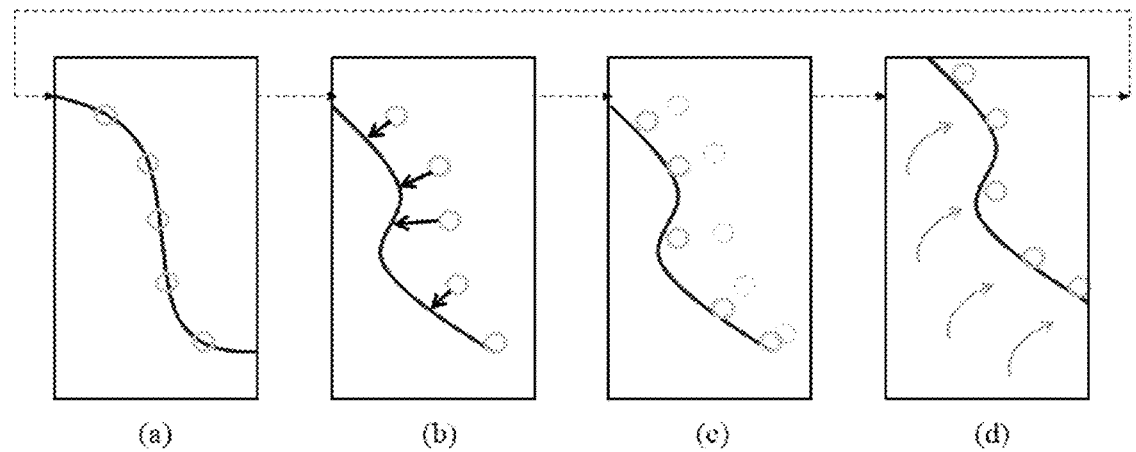
FIG. 21 illustrates multi-frame propagation of segmentation using a feedback correction approach with respect to window/classifier positions, according to one embodiment.

In a second approach to error confinement, a feedback correction may be added to classifier window positions, which may enable the classifiers to keep robust track of the contour or boundary. FIG. 21 illustrates multi-frame propagation of segmentation using a feedback correction approach with respect to window/classifier positions, according to one embodiment. More specifically, FIG. 21 illustrates an exemplary embodiment of such a process, where, as may be seen, initial window positions are indicated in element (a) where the contour passes through the center points of multiple classifier windows. This may represent the situation resulting from the rough alignment of the classifiers (and respective contour segments) via shape prediction. In element (b), a new boundary or contour is formed upon convergence of the iterative refinement process. Then, for each window center, its displacement to the nearest point on the new contour or boundary may be determined. In other words, once the new contour is determined, the normal displacement (vector) from each classifier center point to the new contour may be determined. Then, as indicated in element (c), the classifier window centers may be moved based on the displacement. For example, in one embodiment, the classifier window centers may be moved according to an average displacement around the region, e.g., based on an average of the displacement vectors of neighboring or nearby classifiers, e.g., those that overlap the current classifier, e.g., vectors for windows i−2, i−1, i, i+1, and i+1 may be averaged to move window I, or vectors for classifiers within some distance of the current window may be averaged, etc., as desired. In an alternative embodiment, the classifier window centers may simply be moved to the contour based on their respective displacements. Finally, as illustrated in element (d) of FIG. 21, the boundary or contour and the classifier window centers may be moved or propagated to the next frame via shape prediction, as described above. Thus, once the contour or boundary is moved, the windows centers may subsequently be moved to (or near) the contour.

Thus, one or both of the above approaches to error confinement may be used to limit or ameliorate the propagation and divergence of errors in the automatic segmentation process, although it should be noted that any other error management techniques may be used as desired.

User Interaction

As noted above with reference to FIG. 2 and elsewhere, in some embodiments, in some embodiments, a graphical user interface (GUI) may be provided that allows the user to modify segmentation results, e.g., whereby the user may interact with and intervene in the automatic segmentation process. For example, in situations where an automatically determined contour/segmentation fails to converge, or where the contours are determined to be inaccurate, the user may edit the segmentation results, e.g., in a forward progressive fashion.

Given a well segmented frame, the method may automatically propagate the segmentation to the next N frames, and the user may play the video forward to check the results until an error is found. Two modes of user correction are now presented.

Local Correction

For minor mistakes, the user may correct only a small part of the contour. In other words, only a limited number of windows may be manually updated. The correction may then propagate to the future frames.

Reset Starting Frame

Figure 22:
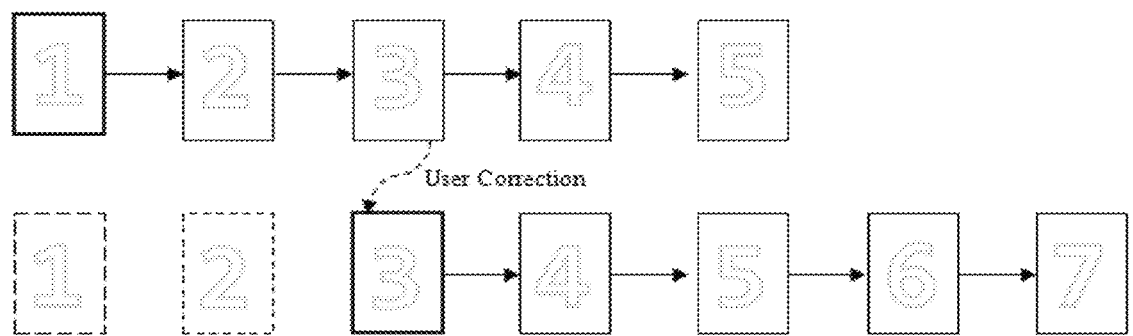
FIG. 22 illustrates user interaction to correct or reset multi-frame propagation of segmentation in a video sequence, according to one embodiment.

In cases where more significant corrections are required, e.g., in number and/or kind, e.g., in cases where, for example, the contour is drifting away from boundary, the foreground object is moving out/into the scene, foreground occlusion, etc., the user may manually correct the current frame, and the current frame may be set as the first or initial frame for the automatic segmentation process, and the method proceeds from this frame, propagating forward until another error occurs. The entire video sequence is segmented when the last frame is reached. FIG. 22 illustrates user interaction to correct or reset multi-frame propagation of segmentation in a video sequence, according to one embodiment, where the top sequence of frames (1 through 5) are automatically segmented based on initial frame 1, but where an error is detected in frame 3 and corrected by the user. Then, as FIG. 22 indicates, corrected frame 3 is reset or designated as an initial frame for continued (recomputed) segmentation of successive frames (4 through 7).

Described in more detail, in some embodiments, performing the above-described determining a segmentation shape prediction and a segmentation color model for a current image of a video sequence, automatically generating a segmentation of the current image, and storing the segmentation of the current image, for one or more contiguous images in the video sequence may include performing the determining a segmentation shape prediction and a segmentation color model for a current image of a video sequence, automatically generating a segmentation of the current image, and storing the segmentation of the current image, for a first plurality of contiguous images in the video sequence, including an ultimate (i.e., last) image in the first plurality of contiguous images, then editing segmentation of the ultimate image in response to input, thereby generating edited segmentation information, then performing the determining a segmentation shape prediction and a segmentation color model for a current image of a video sequence, automatically generating a segmentation of the current image, and storing the segmentation of the current image, for a second plurality of contiguous images in the video sequence, including a first image in the second plurality of contiguous images which is contiguous with the ultimate image in the first plurality of contiguous images in the video sequence. The existing segmentation information used in the determining a segmentation shape prediction and a segmentation color model for the first image in the second plurality of contiguous images may thus include the edited segmentation information.

It should be noted that while the above techniques have been describe as a forward propagation of segmentation in a video sequence, in some embodiments, the techniques may also or instead be propagated in the reverse direction. In other words, the techniques described herein are agnostic or generic with respect to the particular direction of the video sequence.

In some embodiments, this aspect may be used to possibly improve the segmentation process. For example, in one embodiment, embodiments of the methods described above may be performed on a video sequence (possibly a small sub-sequence within the larger video sequence) from either end, e.g., concurrently and/or sequentially, e.g., until the contours for each image converge. For example, in one embodiment, the user may manually segment two key frames bounding a sequence, then propagate inward from both ends, possibly stopping in the middle (at least temporarily) to reconcile competing contours for that image, then optionally continuing to opposite ends, refining the previously computed segmentation (by the opposite propagation). Other variations of this bi-directional technique are also contemplated.

Thus, various embodiments of the above techniques may be used to automatically propagate foreground/background image segmentation in a video sequence.

Exemplary Results

Figure 23:
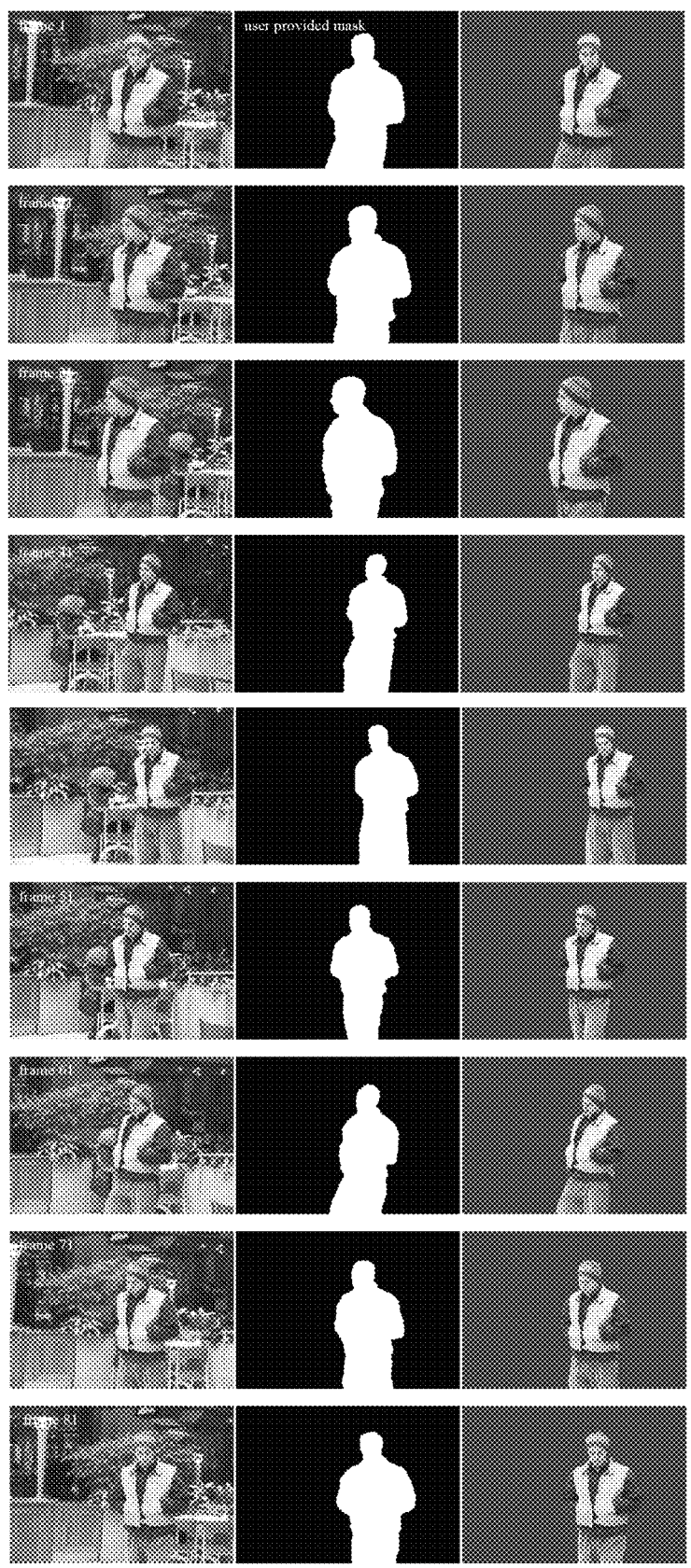
FIGS. 23 and 24 illustrate exemplary video sequences resulting from application of embodiments of the method of FIG. 7.
Figure 24:
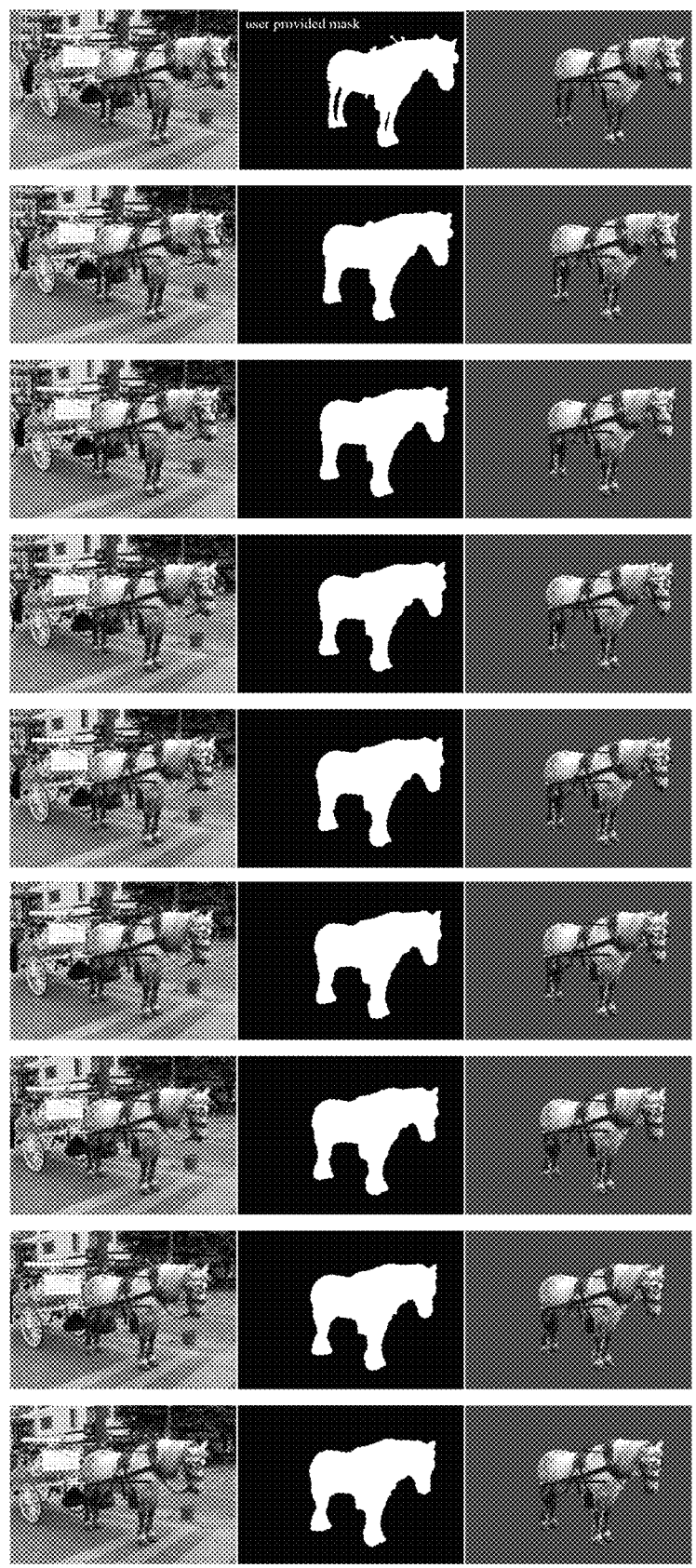

FIGS. 23 and 24 illustrate exemplary video sequences resulting from application of embodiments of the above techniques, where original images of a video sequence are presented vertically on the left (top to bottom), corresponding segmentation masks or feature maps are presented in the middle of the figures, and corresponding images with segmented foreground composited on blue backgrounds are presented vertically on the right. As may be seen, in both sequences, the first (top) segmentation mask is provided by the user. Note that in the sequence of FIG. 23, every $10^{th}$ frame is shown, as indicated by the frame numbers labeling each original frame image.

Thus, various embodiments of the systems and methods disclosed herein may be used to automatically perform image segmentation in a digital video image sequence.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A non-transitory, computer-readable storage medium storing program instructions that when executed by one or more computing devices implement:
   determining a segmentation shape prediction for an image of a video sequence based on received segmentation information;
   determining a segmentation color model for the image of the video sequence based on the received segmentation information for the image of the video sequence;
   automatically generating a segmentation of the image based on the segmentation shape prediction and the segmentation color model; and
   performing said automatically generating a segmentation for a plurality of subsequent images in the video sequence, wherein for each of the plurality of subsequent images the segmentation is based on the same segmentation color model and a different segmentation shape prediction updated for each of the plurality of subsequent images.

2. The non-transitory, computer-readable storage medium of claim 1, wherein said received segmentation information includes segmentation information for at least one previous image of the video sequence, and wherein, in said determining the segmentation shape prediction, the program instructions when executed by the one or more computing devices implement:
   constructing a plurality of local classifiers for the at least one previous image, wherein each local classifier comprises a respective region of the at least one previous image that contains a respective portion of a shape contour of the at least one previous image, and wherein the plurality of local classifiers cover the shape contour of the at least one previous image; and for each local classifier of the plurality of classifiers:
    generating a local segmentation shape prediction for the image based on the respective portion of the shape contour of the at least one previous image contained in the local classifier.

3. The non-transitory, computer-readable storage medium of claim 2, wherein in said automatically generating the segmentation of the image, the program instructions when executed by the one or more computing devices implement:
    generating the segmentation of the image based on a weighted combination of the segmentation shape prediction and the local segmentation color model.

4. The non-transitory, computer-readable storage medium of claim 2, wherein in said generating the local segmentation shape prediction based on the respective portion of the shape contour, the program instructions when executed by the one or more computing devices implement:
    generating an initial local segmentation shape prediction via scale invariant feature transform (SIFT) applied to a plurality of key points in the respective region; and
    generating the local segmentation shape prediction by refining the estimate of the initial local segmentation shape prediction using optical flow applied to points along the respective portion of the shape contour.

5. The non-transitory, computer-readable storage medium of claim 4, wherein, in said generating the local segmentation shape prediction by refining the estimate of the initial local segmentation shape prediction using optical flow applied to points along the respective portion of the shape contour, the program instructions when executed by the one or more computing devices implement:
    determining a local average flow vector based on optical flow of foreground pixels in the respective region; and
    applying the local average flow vector to the points along the respective portion of the shape contour to generate the local segmentation shape prediction.

6. The non-transitory, computer-readable storage medium of claim 5, wherein the program instructions when executed by the one or more computing devices further implement:
    constructing a plurality of local classifiers for the image corresponding to the plurality of local classifiers for the at least one previous image by applying the average flow vector to the plurality of local classifiers for the at least one previous image, wherein each local classifier for the image comprises a respective region of the image that contains a respective portion of a shape contour of the image, and wherein the plurality of local classifiers of the image cover the shape contour of the image.

7. The non-transitory, computer-readable storage medium of claim 2, wherein in said automatically generating the segmentation of the image, the program instructions when executed by the one or more computing devices implement:
    iteratively performing said determining the segmentation shape prediction, and said automatically generating a segmentation of the image, until the shape contour for the current image converges, wherein the segmentation of the image for each iteration is used as the segmentation information for the next iteration.

8. The non-transitory, computer-readable storage medium of claim 7, wherein the program instructions when executed by the one or more computing devices further implement:
    for each iteration of said iteratively performing, upon convergence of the shape contour, repositioning the local classifier onto the shape contour, comprising:
        determining a normal distance from the local classifier's center to the shape contour; and
        moving the local classifier onto the shape contour based at least in part on the normal distance;
    wherein said determining the normal distance and said moving the local classifier ameliorates propagation and divergence of errors.

9. The non-transitory, computer-readable storage medium of claim 2, wherein the respective region of each local classifier of the plurality of local classifiers overlaps the respective regions of at least two other local classifiers of the plurality of local classifiers.

10. The non-transitory, computer-readable storage medium of claim 8,
    wherein said plurality of subsequent images comprise a first plurality of contiguous images in the video sequence, including an ultimate image in the first plurality of contiguous images, and a second plurality of contiguous images in the video sequence, including a first image in the second plurality of contiguous images which is contiguous with the ultimate image in the first plurality of contiguous images in the video sequence;
    wherein said performing said automatically generating the segmentation for the plurality of subsequent images in the video sequence comprises:
        for each of the first plurality of contiguous images in the video sequence performing said automatically generating a segmentation for the contiguous image, wherein the different segmentation shape prediction is the segmentation shape prediction from a contiguous image immediately preceding the contiguous image;
        editing segmentation of the ultimate image in response to input, thereby generating edited segmentation information; and
        for each of the second plurality of contiguous images in the video sequence, performing said automatically generating a segmentation for the contiguous image, wherein the different segmentation shape prediction is the segmentation shape prediction from a contiguous image immediately preceding the contiguous image, and wherein the segmentation shape prediction immediately preceding a first contiguous image of the second plurality of contiguous images comprises the edited segmentation information.

11. A method, comprising:
performing, by one or more computing devices:
    determining a segmentation shape prediction for an image of a video sequence based on received segmentation information;
    determining a segmentation color model for the image of the video sequence based on the received segmentation information for the image of the video sequence;
    automatically generating a segmentation of the image based on the segmentation shape prediction and the segmentation color model; and
    performing said automatically generating a segmentation for a plurality of subsequent images in the video sequence, wherein for each of the plurality of subsequent images the segmentation is based on the same segmentation color model and a different segmentation shape prediction updated for each of the plurality of subsequent images.

12. The method of claim 11, wherein said received segmentation information is segmentation information for at least one previous image of the video sequence, and wherein said determining the segmentation shape prediction comprises:

constructing a plurality of local classifiers for the at least one previous image, wherein each local classifier comprises a respective region of the at least one previous image that contains a respective portion of a shape contour of the at least one previous image, and wherein the plurality of local classifiers cover the shape contour of the at least one previous image; and for each local classifier of the plurality of classifiers:
generating a local segmentation shape prediction for the image based on the respective portion of the shape contour of the at least one previous image contained in the local classifier.

13. The method of claim 12, wherein said automatically generating the segmentation of the image comprises:
generating the segmentation of the image based on a weighted combination of the segmentation shape prediction and the segmentation color model.

14. The method of claim 13, wherein said generating the local segmentation shape prediction based on the respective portion of the shape contour comprises:
generating an initial local segmentation shape prediction via scale invariant feature transform (SIFT) applied to a plurality of key points in the respective region; and
generating the local segmentation shape prediction by refining the estimate of the initial local segmentation shape prediction using optical flow applied to points along the respective portion of the shape contour.

15. The method of claim 14, wherein said generating the local segmentation shape prediction by refining the estimate of the initial local segmentation shape prediction using optical flow applied to points along the respective portion of the shape contour comprises:
determining a local average flow vector based on optical flow of foreground pixels in the respective region; and
applying the local average flow vector to the points along the respective portion of the shape contour to generate the local segmentation shape prediction.

16. The method of claim 15, further comprising constructing a plurality of local classifiers for the image corresponding to the plurality of local classifiers for the at least one previous image by applying the average flow vector to the plurality of local classifiers for the at least one previous image, wherein each local classifier for the image comprises a respective region of the image that contains a respective portion of a shape contour of the image, and wherein the plurality of local classifiers of the image cover the shape contour of the image.

17. The method of claim 12, wherein said generating the segmentation of the image further comprises iteratively performing said determining the segmentation shape prediction and said automatically generating the segmentation of the image, until the shape contour for the image converges, wherein the segmentation of the image for each iteration is used as the segmentation information for the next iteration.

18. The method of claim 17, further comprising:
for each iteration of said iteratively performing, upon convergence of the shape contour, repositioning the local classifier onto the shape contour, comprising:
determining a normal distance from the local classifier's center to the shape contour; and
moving the local classifier onto the shape contour based at least in part on the normal distance;
wherein said determining a normal distance and said moving the local classifier ameliorates propagation and divergence of errors.

19. The method of claim 12, wherein the respective region of each local classifier of the plurality of local classifiers overlaps the respective regions of at least two other local classifiers of the plurality of local classifiers.

20. The method of claim 18,
wherein said plurality of subsequent images comprise a first plurality of contiguous images in the video sequence, including an ultimate image in the first plurality of contiguous images, and a second plurality of contiguous images in the video sequence, including a first image in the second plurality of contiguous images which is contiguous with the ultimate image in the first plurality of contiguous images in the video sequence;
wherein said performing said automatically generating the segmentation for the plurality of subsequent images in the video sequence comprises:
for each of the first plurality of contiguous images in the video sequence performing said automatically generating a segmentation for the contiguous image, wherein the different segmentation shape prediction is the segmentation shape prediction from a contiguous image immediately preceding the contiguous image;
editing segmentation of the ultimate image in response to input, thereby generating edited segmentation information; and
for each of the second plurality of contiguous images in the video sequence, performing said automatically generating a segmentation for the contiguous image, wherein the different segmentation shape prediction is the segmentation shape prediction from a contiguous image immediately preceding the contiguous image, and wherein the segmentation shape prediction immediately preceding a first contiguous image of the second plurality of contiguous images comprises the edited segmentation information.

* * * * *

UNITED STATES PATENT AND TRADEMARK OFFICE
CERTIFICATE OF CORRECTION

PATENT NO.       : 8,422,775 B2
APPLICATION NO.  : 13/448162
DATED            : April 16, 2013
INVENTOR(S)      : Jue Wang and Xue Bai Page 1 of 1

It is certified that error appears in the above-identified patent and that said Letters Patent is hereby corrected as shown below:

In the Claims:

Column 23, line 12, delete "local", therefor.

Column 23, line 57, delete "current", therefor.

Signed and Sealed this
Second Day of July, 2013

Teresa Stanek Rea
*Acting Director of the United States Patent and Trademark Office*